United States Patent
Li et al.

(10) Patent No.: US 11,643,530 B2
(45) Date of Patent: May 9, 2023

(54) POLYETHYLENE COMPOSITIONS WITH IMPROVED SEALING PERFORMANCE AND TEAR STRENGTH

(71) Applicant: ExxonMobil Chemical Patents Inc., Baytown, TX (US)

(72) Inventors: Dongming Li, Houston, TX (US); Ching-Tai Lue, Sugar Land, TX (US); Qingyun Qian, Shanghai (CN); Ling Ge, Shanghai (CN); Gang Huang, Shanghai (CN)

(73) Assignee: ExxonMobil Chemical Patents Inc., Baytown, TX (US)

(*) Notice: Subject to any disclaimer, the term of this patent is extended or adjusted under 35 U.S.C. 154(b) by 248 days.

(21) Appl. No.: 17/227,490

(22) Filed: Apr. 12, 2021

(65) Prior Publication Data

US 2021/0324185 A1 Oct. 21, 2021

Related U.S. Application Data

(60) Provisional application No. 63/011,054, filed on Apr. 16, 2020.

(51) Int. Cl.
*C08L 23/06* (2006.01)
*C08J 5/18* (2006.01)

(52) U.S. Cl.
CPC ........... *C08L 23/06* (2013.01); *C08J 5/18* (2013.01); *C08J 2323/06* (2013.01); *C08L 2207/062* (2013.01); *C08L 2207/066* (2013.01)

(58) Field of Classification Search
CPC ........... C08L 23/06; C08L 23/0815; C08L 2207/062; C08J 2323/06; C08J 2323/08
See application file for complete search history.

(56) References Cited

U.S. PATENT DOCUMENTS

| 7,179,876 B2 | 2/2007 | Szul et al. | |
| 2003/0187083 A1* | 10/2003 | Harris | C08L 23/06 525/240 |

* cited by examiner

*Primary Examiner* — Jeffrey C Mullis
(74) *Attorney, Agent, or Firm* — ExxonMobil Chemical Patents Inc.—Law Department

(57) ABSTRACT

Embodiments relate to polyolefin compositions containing one or more high-density polyethylenes (HDPEs) and linear low-density polyethylenes (LLDPEs) and methods for forming the same. The polyolefin composition contains about 40 wt % to about 60 wt % of HDPE and about 40 wt % to about 60 wt % of LLDPE, by weight of the polyolefin composition. The HDPE has a density of greater than 0.93 g/cm$^3$ and a melt index of about 0.2 dg/min to about 10 dg/min. The LLDPE has a density of less than 0.915 g/cm$^3$ and a melt index of about 0.2 dg/min to about 10 dg/min. The polyolefin composition has a density of about 0.91 g/cm$^3$ or greater, a melt index of about 0.5 dg/min to about 6 dg/min, and a $T_{w1}-T_{w2}$ value of about −25° C. or less.

13 Claims, 3 Drawing Sheets

POLYETHYLENE COMPOSITIONS WITH IMPROVED SEALING PERFORMANCE AND TEAR STRENGTH

CROSS-REFERENCE TO RELATED APPLICATION

This application claims the benefit of U.S. Provisional Application 63/011,054, filed Apr. 16, 2020, entitled "Polyethylene Compositions With Improved Sealing Performance And Tear Strength", the entirety of which is incorporated by reference herein.

FIELD

Embodiments described and discussed herein relate to polyethylene compositions, films thereof, and methods for making the same.

BACKGROUND

Polyethylene (PE) and low-density polyethylene (LDPE) are used predominately in packaging applications, in which sealing performance is important. Conventionally, good sealing performance is closely associated with low resin density, thus also low stiffness. Sealing performance covers a broad scope of aspects such as the ease of seal formation, seal integrity and robustness, and the strength of sealed parts, etc. In practice, low sealing temperature, high line speed, hermetic or airtight seals are desirable. Sealing performance of LDPE films can be characterized by heat seal test and hot-tack tests and is closely related with its melting behavior. In general for a PE resin, the lower the density, the seal initiation temperature and the ease of seal formation are also lowered. However, lowering the density will also reduce the stiffness of the package, which can be undesirable.

U.S. Pat. No. 7,179,876 in Table II, discloses LLDPE's having densities over 0.915 g/cc made with $(PrCp)_2HfMe_2$ and blended with Irganox™ 1076, Irgafos™168, and Dynamar FX 5920A.

Therefore, there is a need for improved polyolefin compositions having sealing performance at equal or higher stiffness, and toughness or tear resistance, over comparative resins at equal or better stiffness, as well as methods for producing the polyolefin compositions and forming articles from the polyolefin compositions.

SUMMARY

Embodiments described and discussed herein relate to polyolefin compositions containing one or more high-density polyethylenes (HDPEs) and linear low-density polyethylenes (LLDPEs) and methods for forming the same. The polyolefin compositions described and discussed herein have improved sealing performance without scarifying stiffness. By combining polyethylene (PE) of low and high densities but maintaining the overall density relatively unchanged, the polyolefin compositions have greatly improved sealing performance and surprisingly greater stiffness than reference PE compositions at the same density. Furthermore, the polyolefin compositions have improved toughness and/or tear resistance over comparative resins/polymers at equal or better stiffness.

In one or more embodiments, a polyolefin composition contains about 40 wt % to about 60 wt % of a HDPE and about 40 wt % to about 60 wt % of a LLDPE, by weight of the polyolefin composition. The HDPE has a density of greater than 0.93 g/cm$^3$ and a melt index of about 0.2 dg/min to about 10 dg/min, such as about 0.5 dg/min to about 2 dg/min. The LLDPE has a density of less than 0.915 g/cm$^3$ and a melt index of about 0.2 dg/min to about 10 dg/min, such as about 0.5 dg/min to about 2 dg/min. The polyolefin composition has a density of about 0.91 g/cm$^3$ or greater, a melt index of about 0.5 dg/min to about 6 dg/min, such as about 0.8 dg/min to about 2 dg/min, and a $T_{w1}-T_{w2}$ value of about −25° C. or less.

In other embodiments, a polyolefin composition contains about 40 wt % to about 60 wt % of a HDPE and about 40 wt % to about 60 wt % of a LLDPE, by weight of the polyolefin composition. The HDPE has a density of greater than 0.93 g/cm$^3$ and the LLDPE has a density of less than 0.915 g/cm$^3$. The polyolefin composition has a density of about 0.915 g/cm$^3$ to about 0.935 g/cm$^3$, a melt index of about 0.5 dg/min to about 6 dg/min, such as about 0.8 dg/min to about 2 dg/min, a $T_{w1}-T_{w2}$ value of about −60° C. to about −25° C., a 1% Secant average value of about 30,000 psi to about 44,000 psi, an Elmendorf Tear value in the machine direction of about 320 g/mil to about 500 g/mil, an Elmendorf Tear value in the transverse direction of about 475 g/mil to about 700 g/mil, and a seal temperature at 1 N of about 70° C. to about 85° C.

In some embodiments, a polyolefin composition contains about 40 wt % to about 60 wt % of a HDPE, about 40 wt % to about 60 wt % of a LLDPE, and an additive at a concentration of about 0.001 wt % to about 2 wt %, by weight of the polyolefin composition. The HDPE has a density of greater than 0.93 g/cm$^3$ and the LLDPE has a density of less than 0.915 g/cm$^3$. The polyolefin composition has a density of about 0.915 g/cm$^3$ to about 0.935 g/cm$^3$, a $T_{w1}-T_{w2}$ value of about −60° C. to about −25° C., an Elmendorf Tear value in the machine direction of about 320 g/mil to about 500 g/mil, an Elmendorf Tear value in the transverse direction of about 475 g/mil to about 700 g/mil, and a seal temperature at 1 N of about 70° C. to about 85° C.

In one or more embodiments, a method of forming an article containing a polyolefin composition includes extruding or rolling the polyolefin composition to produce a film and cooling the film. The polyolefin composition contains about 40 wt % to about 60 wt % of a HDPE, about 40 wt % to about 60 wt % of a LLDPE, and an additive at a concentration of about 0.001 wt % to about 2 wt %, by weight of the polyolefin composition. The HDPE has a density of greater than 0.93 g/cm$^3$ and the LLDPE has a density of less than 0.915 g/cm$^3$. The polyolefin composition has a density of about 0.915 g/cm$^3$ to about 0.935 g/cm$^3$, a $T_{w1}-T_{w2}$ value of about −60° C. to about −25° C., an Elmendorf Tear value in the machine direction of about 320 g/mil to about 500 g/mil, an Elmendorf Tear value in the transverse direction of about 475 g/mil to about 700 g/mil, and a seal temperature at 1 N of about 70° C. to about 85° C. and/or at 5 N of about 80° C. to about 95° C.

BRIEF DESCRIPTION OF DRAWINGS

So that the manner in which the above recited features of the disclosure can be understood in detail, a more particular description of the disclosure, briefly summarized above, may be had by reference to implementations, some of which are illustrated in the appended drawings. It is to be noted, however, that the appended drawings illustrate only typical implementations of this disclosure and are therefore not to be considered limiting of scope, for the disclosure may admit to other equally effective implementations.

Figure 1:
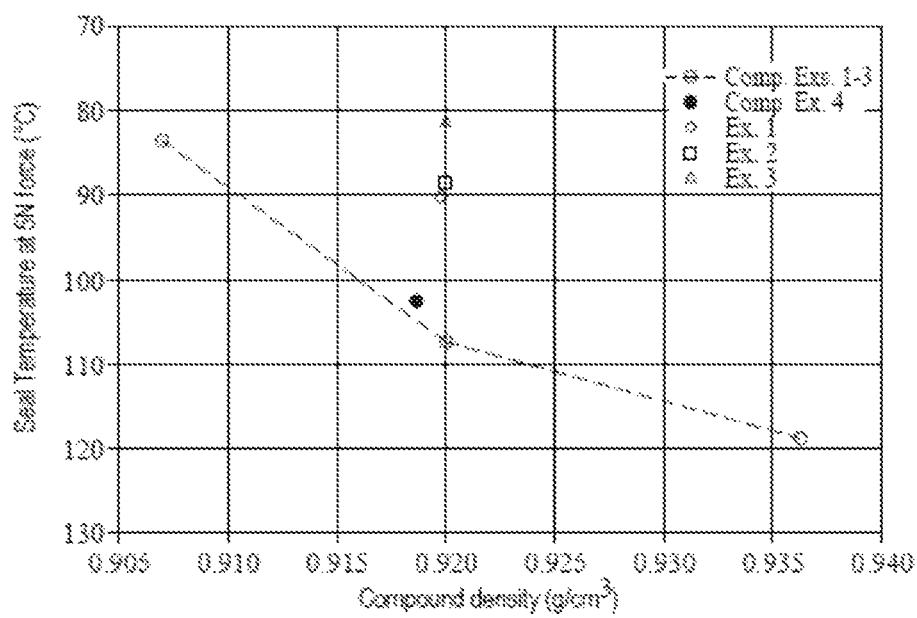
FIG. 1 depicts a graph illustrating seal temperatures at 5 N of force on the basis of density for the polyolefin compositions relative to different comparative polyethylene compositions, according to one or more embodiments.

To facilitate understanding, identical reference numerals have been used, where possible, to designate identical elements that are common to the Figures. It is contemplated that elements and features of one implementation may be beneficially incorporated in other implementations without further recitation, according to one or more embodiments.

DETAILED DESCRIPTION

Embodiments described and discussed herein provide polyolefin compositions having improved sealing performance at equal or higher stiffness, and improved toughness or tear resistance over comparative resins/polymers at equal or better stiffness. Embodiments also include methods for producing the polyolefin compositions and forming articles from the polyolefin compositions. In one or more embodiments, a polyolefin composition can be or include one, two, or more polyethylenes. For example, the polyolefin composition can be or include a blend of the two or more polyethylenes, such as one or more high-density polyethylenes (HDPEs) and one or more linear low-density polyethylenes (LLDPEs). The polyolefin compositions described and discussed herein have advantageously improved processability over traditional polyethylenes, without significantly impacting the mechanical properties. More specifically, the polyethylene compositions and films thereof have improved sealing performance at equal or higher stiffness and improved toughness or tear resistance over comparative polyethylenes at equal or better stiffness. In one or more examples, films containing the polyolefin composition are obtained from one or more blown film extrusion processes or cast film extrusion processes, or through uniaxial and/or biaxial stretching, such as machine direction orientation PE (MDO-PE) or biaxially orientated polyethylene (BOPE). In some examples, a film containing the polyolefin composition can be or include a blown film, a cast film, a compression-molded film, a machine-direction oriented film, a biaxial oriented film, or any combination thereof.

An "olefin," alternatively referred to as "alkene," is a linear, branched, or cyclic compound of carbon and hydrogen having at least one double bond. For purposes of this specification and the claims appended thereto, when a polymer or copolymer is referred to as containing an olefin including ethylene, hexene, and diene, the olefin present in such polymer or copolymer is the polymerized form of the olefin. For example, when a copolymer is said to have an "ethylene" content of 35 wt % to 55 wt %, it is understood that a mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. The term "different," as used to refer to mer units, indicates that the mer units differ from each other by at least one atom or are different isomerically. Accordingly, the definition of copolymer, as used herein, includes terpolymers and the like. Likewise, the definition of polymer, as used herein, includes copolymers and the like. Thus, as used herein, the terms "polyethylene," "ethylene polymer," "ethylene copolymer," and "ethylene based polymer" mean a polymer or copolymer containing at least 50 mol % ethylene units (at least 70 mol % ethylene units, at least 80 mol % ethylene units, at least 90 mol % ethylene units, at least 95 mol % ethylene units, or 100 mol % ethylene units (in the case of a homopolymer)). Furthermore, the term "polyethylene composition" means a blend containing one or more polyethylene components.

As used herein, the terms "polypropylene," "propylene polymer," "propylene copolymer," and "propylene based polymer" mean a polymer or copolymer containing at least 50 mol % propylene units (at least 70 mol % propylene units, at least 80 mol % propylene units, at least 90 mol % propylene units, at least 95 mol % propylene units, or 100 mol % propylene units (in the case of a homopolymer)).

As used herein, the terms "polybutene," "butene polymer," "butene copolymer," and "butene based polymer" mean a polymer or copolymer containing at least 50 mol % butene units (at least 70 mol % butene units, at least 80 mol % butene units, at least 90 mol % butene units, at least 95 mol % butene units, or 100 mol % butene units (in the case of a homopolymer)).

An ethylene polymer having a density of 0.86 g/cm$^3$ or less is referred to as an ethylene elastomer or elastomer; an ethylene polymer having a density of more than 0.86 to less than 0.910 g/cm$^3$ is referred to as an ethylene plastomer or plastomer; an ethylene polymer having a density of 0.910 to 0.930 g/cm$^3$ is referred to as a low-density polyethylene (LDPE); an ethylene polymer having a density of greater than 0.930 g/cm$^3$ or greater than 0.940 g/cm$^3$ is referred to as a high density polyethylene (HDPE). For these definitions, density is determined using the method described under Test Methods below.

Polyethylene in an overlapping density range, e.g., 0.890 to 0.930 g/cm$^3$ which is linear and does not contain long-chain branching, is referred to as "linear low-density polyethylene" (LLDPE) and can be produced with conventional Ziegler-Natta catalysts, vanadium catalysts, or with metallocene catalysts in gas phase reactors and/or in slurry reactors and/or with any of the disclosed catalysts in solution reactors. "mLLDPE" is an LLDPE made by a metallocene catalyst.

"Linear" means that the polyethylene has no long-chain branches; typically referred to as a g'$_{vis}$ of 0.95 or greater, 0.97 or greater, 0.98 or greater.

Mw is weight average molecular weight, Mn is number average molecular weight, and Mz is z average molecular weight. MD is machine direction and TD is transverse direction.

Polyolefin Compositions

In one or more embodiments, the polyolefin composition or film thereof contains about 10 wt %, about 20 wt %, about 30 wt %, about 35 wt %, about 40 wt %, about 45 wt % to about 50 wt %, about 55 wt %, about 60 wt %, about 65 wt %, about 70 wt %, about 75 wt %, about 80 wt %, or about 90 wt % of the HDPE, by weight of the polyolefin composition. For example, the polyolefin composition or film thereof contains about 10 wt % to about 90 wt %, about 20 wt % to about 90 wt %, about 30 wt % to about 90 wt %, about 40 wt % to about 90 wt %, about 50 wt % to about 90 wt %, about 60 wt % to about 90 wt %, about 70 wt % to about 90 wt %, about 10 wt % to about 70 wt %, about 20 wt % to about 70 wt %, about 30 wt % to about 70 wt %, about 40 wt % to about 70 wt %, about 50 wt % to about 70 wt %, about 60 wt % to about 70 wt %, about 10 wt % to about 60 wt %, about 20 wt % to about 60 wt %, about 30 wt % to about 60 wt %, about 40 wt % to about 60 wt %, about 50 wt % to about 60 wt %, about 10 wt % to about 50 wt %, about 20 wt % to about 50 wt %, about 30 wt % to about 50 wt %, about 40 wt % to about 50 wt %, about 10 wt % to about 55 wt %, about 25 wt % to about 55 wt %, about 35 wt % to about 55 wt %, about 45 wt % to about 55 wt %, about 50 wt % to about 55 wt %, about 35 wt % to about 90 wt %, about 45 wt % to about 90 wt %, about 55 wt % to about 90 wt %, about 65 wt % to about 90 wt %, about 35 wt % to about 60 wt %, about 45 wt % to about 60 wt %, about 55 wt % to about 60 wt %, about 35 wt % to about 50 wt %, or about 45 wt % to about 50 wt % of the HDPE, by weight of the polyolefin composition.

In one or more embodiments, the polyolefin composition or film thereof contains about 10 wt %, about 20 wt %, about 30 wt %, about 35 wt %, about 40 wt %, about 45 wt % to about 50 wt %, about 55 wt %, about 60 wt %, about 65 wt %, about 70 wt %, about 75 wt %, about 80 wt %, or about 90 wt % of the LLDPE, by weight of the polyolefin composition. For example, the polyolefin composition or film thereof contains about 10 wt % to about 90 wt %, about 20 wt % to about 90 wt %, about 30 wt % to about 90 wt %, about 40 wt % to about 90 wt %, about 50 wt % to about 90 wt %, about 60 wt % to about 90 wt %, about 70 wt % to about 90 wt %, about 10 wt % to about 70 wt %, about 20 wt % to about 70 wt %, about 30 wt % to about 70 wt %, about 40 wt % to about 70 wt %, about 50 wt % to about 70 wt %, about 60 wt % to about 70 wt %, about 10 wt % to about 60 wt %, about 20 wt % to about 60 wt %, about 30 wt % to about 60 wt %, about 40 wt % to about 60 wt %, about 50 wt % to about 60 wt %, about 10 wt % to about 50 wt %, about 20 wt % to about 50 wt %, about 30 wt % to about 50 wt %, about 40 wt % to about 50 wt %, about 10 wt % to about 55 wt %, about 25 wt % to about 55 wt %, about 35 wt % to about 55 wt %, about 45 wt % to about 55 wt %, about 50 wt % to about 55 wt %, about 35 wt % to about 90 wt %, about 45 wt % to about 90 wt %, about 55 wt % to about 90 wt %, about 65 wt % to about 90 wt %, about 35 wt % to about 60 wt %, about 45 wt % to about 60 wt %, about 55 wt % to about 60 wt %, about 35 wt % to about 50 wt %, or about 45 wt % to about 50 wt % of the LLDPE, by weight of the polyolefin composition.

In one or more examples, the polyolefin composition or film thereof contains about 40 wt % to about 60 wt % of the HDPE and about 40 wt % to about 60 wt % of the LLDPE. In other examples, the polyolefin composition or film thereof contains about 45 wt % to about 55 wt % of the HDPE and about 45 wt % to about 55 wt % of the LLDPE. In some examples, the polyolefin composition or film thereof contains about 50 wt % of the HDPE and about 50 wt % of the LLDPE. In other examples, the polyolefin composition or film thereof contains about 40 wt % to about 45 wt % of the HDPE and about 55 wt % to about 60 wt % of the LLDPE. In some examples, the polyolefin composition or film thereof contains about 53 wt % to about 55 wt % of the HDPE and about 45 wt % to about 47 wt % of the LLDPE.

The polyolefin composition or film thereof has a density of about 0.91 g/cm$^3$ or greater, such as about 0.915 g/cm$^3$, about 0.918 g/cm$^3$, about 0.92 g/cm$^3$, or about 0.922 g/cm$^3$ to about 0.925 g/cm$^3$, about 0.928 g/cm$^3$, about 0.93 g/cm$^3$, about 0.932 g/cm$^3$, about 0.934 g/cm$^3$, about 0.935 g/cm$^3$, about 0.936 g/cm$^3$, about 0.938 g/cm$^3$, about 0.94 g/cm$^3$, about 0.942 g/cm$^3$, about 0.95 g/cm$^3$, or greater. For example, the polyolefin composition or film thereof has a density of about 0.91 g/cm$^3$ to about 0.95 g/cm$^3$, about 0.91 g/cm$^3$ to about 0.94 g/cm$^3$, about 0.915 g/cm$^3$ to about 0.94 g/cm$^3$, about 0.92 g/cm$^3$ to about 0.94 g/cm$^3$, about 0.925 g/cm$^3$ to about 0.94 g/cm$^3$, about 0.93 g/cm$^3$ to about 0.94 g/cm$^3$, about 0.935 g/cm$^3$ to about 0.94 g/cm$^3$, about 0.91 g/cm$^3$ to less than 0.94 g/cm$^3$, about 0.915 g/cm$^3$ to less than 0.94 g/cm$^3$, about 0.92 g/cm$^3$ to less than 0.94 g/cm$^3$, about 0.925 g/cm$^3$ to less than 0.94 g/cm$^3$, about 0.93 g/cm$^3$ to less than 0.94 g/cm$^3$, about 0.935 g/cm$^3$ to less than 0.94 g/cm$^3$, about 0.91 g/cm$^3$ to about 0.935 g/cm$^3$, about 0.915 g/cm$^3$ to about 0.935 g/cm$^3$, about 0.92 g/cm$^3$ to about 0.935 g/cm$^3$, about 0.925 g/cm$^3$ to about 0.935 g/cm$^3$, about 0.93 g/cm$^3$ to about 0.935 g/cm$^3$, about 0.91 g/cm$^3$ to about 0.93 g/cm$^3$, about 0.915 g/cm$^3$ to about 0.93 g/cm$^3$, about 0.92 g/cm$^3$ to about 0.93 g/cm$^3$, or about 0.925 g/cm$^3$ to about 0.93 g/cm$^3$.

The polyolefin composition or film thereof has a $T_{w1}-T_{w2}$ value of about −25° C. or less, such as about −28° C., about −30° C., about −32° C., about −35° C., about −38° C., or about −40° C. to about −45° C., about −48° C., about −50° C., about −55° C., about −60° C. or less. For example, the polyolefin composition or film thereof has a $T_{w1}-T_{w2}$ value of about −60° C. to about −25° C., about −60° C. to about −30° C., about −60° C. to about −35° C., about −60° C. to about −40° C., about −60° C. to about −45° C., about −60° C. to about −50° C., about −50° C. to about −25° C., about −50° C. to about −30° C., about −50° C. to about −35° C., about −50° C. to about −40° C., about −50° C. to about −45° C., about −40° C. to about −25° C., about −40° C. to about −30° C., or about −40° C. to about −35° C. The $T_{w1}-T_{w2}$ value is the subtracted difference of the $T_{w2}$ value from the $T_{w1}$ value, where the $T_{w1}$ and $T_{w2}$ are determined using data from cross fractionation chromatography (CFC) performed on a CFC-2 instrument form Polymer Char, Valencia Spain. The $T_{w1}$, and $T_{w2}$, are calculated by the CFC data file as reported from the instrument software as described at column 29, line 1 to column 32, line 17 and figures 3A, 3B and 4 of U.S. Pat. No. 10,253,121, which is herein incorporated by reference.

The polyolefin composition further has a $M_{w1}/M_{w2}$ value of about 0.85, about 0.86, about 0.88, or about 0.90 to about 0.92, about 0.94, about 0.96, about 0.98, about 1.00, about 1.02, about 1.04, about 1.06, about 1.08, about 1.10, or greater. For example, the polyolefin composition has a $M_{w1}/M_{w2}$ value of about 0.85 to about 1.10, about 0.85 to about 1.08, about 0.85 to about 1.05, about 0.85 to about 1.02, about 0.85 to about 1.00, about 0.85 to about 0.95, about 0.85 to about 0.90, about 0.88 to about 1.10, about 0.88 to about 1.08, about 0.88 to about 1.05, about 0.88 to about 1.02, about 0.88 to about 1.00, about 0.88 to about 0.95, or about 0.88 to about 0.90. The $M_{w1}/M_{w2}$ value is the ratio of the $M_{w1}$ value over the $M_{w2}$ value, where the $M_{w1}$ and $M_{w2}$ values are determined using data from cross fractionation chromatography (CFC) performed on a CFC-2 instrument from Polymer Char, Valencia Spain. The $M_{w1}$, and $M_{w2}$ are calculated by the CFC data file as reported from the instrument software as described at column 29, line 1 to column 32, line 17 and FIGS. 3A, 3B and 4 of U.S. Pat. No. 10,253,121, which is herein incorporated by reference.

The polyolefin composition or film thereof has a 1% Secant average value of about 30,000 psi, about 32,000 psi, about 34,000 psi, about 35,000 psi, or about 36,000 psi to about 38,000 psi, about 40,000 psi, about 42,000 psi, about 44,000 psi, about 46,000 psi, or greater. For example, the polyolefin composition or film thereof has a 1% Secant average value of about 30,000 psi to about 46,000 psi, about 30,000 psi to about 44,000 psi, about 30,000 psi to about 42,000 psi, about 30,000 psi to about 40,000 psi, about 30,000 psi to about 38,000 psi, about 30,000 psi to about 36,000 psi, about 32,000 psi to about 46,000 psi, about 32,000 psi to about 44,000 psi, about 32,000 psi to about 42,000 psi, about 32,000 psi to about 40,000 psi, about 32,000 psi to about 38,000 psi, or about 32,000 psi to about 36,000 psi. The 1% Secant average values are determined by the ASTM D-882 standard modified per details listed below in Table 1.

The polyolefin composition or film thereof has an Elmendorf Tear value in the machine direction of about 320 g/mil, about 335 g/mil, about 350 g/mil, about 375 g/mil, or about 400 g/mil to about 420 g/mil, about 435 g/mil, about 450 g/mil, about 475 g/mil, about 500 g/mil, about 520 g/mil, about 550 g/mil, or greater. For example, the polyolefin composition or film thereof has an Elmendorf Tear value in the machine direction of about 320 g/mil to about 550 g/mil, about 320 g/mil to about 500 g/mil, about 320 g/mil to about 450 g/mil, about 320 g/mil to about 400 g/mil, about 350 g/mil to about 550 g/mil, about 350 g/mil to about 500 g/mil, about 350 g/mil to about 450 g/mil, or about 350 g/mil to about 400 g/mil. The Elmendorf Tear values are determined by the ASTM D-1992 standard per details listed below in Table 1.

The polyolefin composition or film thereof has an Elmendorf Tear value in the transverse direction of about 400 g/mil, about 450 g/mil, about 475 g/mil, about 500 g/mil, or about 550 g/mil to about 600 g/mil, about 650 g/mil, about 675 g/mil, about 700 g/mil, about 750 g/mil, or about 800 g/mil. For example, the polyolefin composition or film thereof has an Elmendorf Tear value in the transverse direction of about 450 g/mil to about 750 g/mil, about 475 g/mil to about 750 g/mil, about 475 g/mil to about 700 g/mil, about 475 g/mil to about 675 g/mil, about 475 g/mil to about 650 g/mil, about 475 g/mil to about 625 g/mil, about 475 g/mil to about 600 g/mil, about 500 g/mil to about 750 g/mil, about 500 g/mil to about 700 g/mil, about 500 g/mil to about 675 g/mil, about 500 g/mil to about 650 g/mil, about 500 g/mil to about 625 g/mil, or about 500 g/mil to about 600 g/mil.

The polyolefin composition or film thereof has a melt index (MI) of about 0.5 dg/min, about 0.6 dg/min, about 0.8 dg/min, about 1 dg/min, or about 1.2 dg/min to about 1.5 dg/min, about 1.8 dg/min, about 2 dg/min, about 2.5 dg/min, about 3 dg/min, about 4 dg/min, about 5 dg/min, about 5.5 dg/min, or about 6 dg/min. For example, the polyolefin composition or film thereof has a melt index of about 0.5 dg/min to about 6 dg/min, about 0.5 dg/min to about 4 dg/min, about 0.5 dg/min to about 2 dg/min, about 0.8 dg/min to about 6 dg/min, about 0.8 dg/min to about 4 dg/min, or about 0.8 dg/min to about 2 dg/min. The MI values are determined by the ASTM D-1238 standard (190° C., 2.16 kg).

The polyolefin composition or film thereof has a seal temperature at 1 N of about 65° C., about 68° C., about 70° C., about 72° C., or about 75° C. to about 78° C., about 80° C., about 82° C., about 85° C., or about 88° C. For example, the polyolefin composition or film thereof has a seal temperature at 1 N of about 65° C. to about 88° C., about 65° C. to about 85° C., about 65° C. to about 82° C., about 65° C. to about 80° C., about 68° C. to about 88° C., about 68° C. to about 85° C., about 68° C. to about 82° C., about 68° C. to about 80° C., about 70° C. to about 88° C., about 70° C. to about 85° C., about 70° C. to about 82° C., about 70° C. to about 80° C., about 75° C. to about 88° C., about 75° C. to about 85° C., about 75° C. to about 82° C., or about 75° C. to about 80° C. The seal temperature values are determined by procedure described and discussed below.

The polyolefin composition or film thereof has a seal temperature at 5 N of about 70° C., about 72° C., about 75° C., about 78° C., about 80° C., about 82° C., or about 85° C. to about 88° C., about 90° C., about 92° C., about 95° C., about 98° C., or about 100° C. For example, the polyolefin composition or film thereof has a seal temperature at 5 N of about 70° C. to about 100° C., about 70° C. to about 98° C., about 70° C. to about 95° C., about 70° C. to about 92° C., about 70° C. to about 90° C., about 70° C. to about 88° C., about 70° C. to about 85° C., about 75° C. to about 100° C., about 75° C. to about 98° C., about 75° C. to about 95° C., about 75° C. to about 92° C., about 75° C. to about 90° C., about 75° C. to about 88° C., about 75° C. to about 85° C., about 80° C. to about 100° C., about 80° C. to about 98° C., about 80° C. to about 95° C., about 80° C. to about 92° C., about 80° C. to about 90° C., about 80° C. to about 88° C., about 80° C. to about 85° C., about 82° C. to about 100° C., about 82° C. to about 98° C., about 82° C. to about 95° C., about 82° C. to about 92° C., about 82° C. to about 90° C., about 82° C. to about 88° C., or about 82° C. to about 85° C.

The polyolefin composition or film thereof has a peel-break transition temperature of about 85° C., about 90° C., about 92° C., about 95° C., about 98° C., about 100° C., about 105° C. to about 108° C., about 110° C., about 112° C., about 115° C., about 118° C., about 120° C., about 125° C., or about 130° C. For example, the polyolefin composition or film thereof has a peel-break transition temperature of about 85° C. to about 130° C., about 90° C. to about 130° C., about 90° C. to about 125° C., about 90° C. to about 120° C., about 90° C. to about 118° C., about 90° C. to about 115° C., about 90° C. to about 112° C., about 90° C. to about 110° C., about 90° C. to about 105° C., about 90° C. to about 100° C., about 95° C. to about 130° C., about 95° C. to about 125° C., about 95° C. to about 120° C., about 95° C. to about 118° C., about 95° C. to about 115° C., about 95° C. to about 112° C., about 95° C. to about 110° C., about 95° C. to about 105° C., about 95° C. to about 100° C., about 100° C. to about 130° C., about 100° C. to about 125° C., about 100° C. to about 120° C., about 100° C. to about 118° C., about 100° C. to about 115° C., about 100° C. to about 112° C., about 100° C. to about 110° C., about 100° C. to about 105° C., about 105° C. to about 130° C., about 105° C. to about 125°

C., about 105° C. to about 120° C., about 105° C. to about 118° C., about 105° C. to about 115° C., about 105° C. to about 112° C., or about 105° C. to about 110° C. The peel-break transition temperature values of the polyolefin compositions are determined by procedures further described and discussed below.

The polyolefin composition or film thereof has a hot tack temperature at 1 N of about 60° C., about 65° C., about 68° C., about 70° C., about 72° C., about 75° C., about 78° C., about 80° C., about 82° C., or about 85° C. to about 88° C., about 90° C., about 92° C., about 95° C., about 98° C., or about 100° C. For example, the polyolefin composition or film thereof has a hot tack temperature at 1 N of about 60° C. to about 100° C., about 60° C. to about 98° C., about 60° C. to about 95° C., about 60° C. to about 92° C., about 60° C. to about 90° C., about 60° C. to about 88° C., about 60° C. to about 85° C., about 65° C. to about 100° C., about 65° C. to about 98° C., about 65° C. to about 95° C., about 65° C. to about 92° C., about 65° C. to about 90° C., about 65° C. to about 88° C., about 65° C. to about 85° C., about 70° C. to about 100° C., about 70° C. to about 98° C., about 70° C. to about 95° C., about 70° C. to about 92° C., about 70° C. to about 90° C., about 70° C. to about 88° C., about 70° C. to about 85° C., about 75° C. to about 100° C., about 75° C. to about 98° C., about 75° C. to about 95° C., about 75° C. to about 92° C., about 75° C. to about 90° C., about 75° C. to about 88° C., about 75° C. to about 85° C., about 80° C. to about 100° C., about 80° C. to about 98° C., about 80° C. to about 95° C., about 80° C. to about 92° C., about 80° C. to about 90° C., about 80° C. to about 88° C., or about 80° C. to about 85° C. The hot tack temperatures and the hot tack window temperatures are determined by procedures further described and discussed below as well as outlined below in Table 1.

The polyolefin composition or film thereof has a hot tack temperature at 5 N of about 70° C., about 72° C., about 75° C., about 78° C., about 80° C., about 82° C., about 85° C., or about 90° C. to about 92° C., about 95° C., about 98° C., about 100° C., about 102° C., about 105° C., about 108° C., about 110° C., about 115° C., about 118° C., or about 120° C. For example, the polyolefin composition or film thereof has a hot tack temperature at 5 N of about 70° C. to about 120° C., about 75° C. to about 120° C., about 78° C. to about 120° C., about 80° C. to about 120° C., about 85° C. to about 120° C., about 88° C. to about 120° C., about 90° C. to about 120° C., about 95° C. to about 120° C., about 100° C. to about 120° C., about 75° C. to about 110° C., about 78° C. to about 110° C., about 80° C. to about 110° C., about 85° C. to about 110° C., about 88° C. to about 110° C., about 90° C. to about 110° C., about 95° C. to about 110° C., about 100° C. to about 110° C., about 75° C. to about 105° C., about 78° C. to about 105° C., about 80° C. to about 105° C., about 85° C. to about 105° C., about 88° C. to about 105° C., about 90° C. to about 105° C., about 95° C. to about 105° C., about 100° C. to about 105° C., about 75° C. to about 100° C., about 78° C. to about 100° C., about 80° C. to about 100° C., about 85° C. to about 100° C., about 88° C. to about 100° C., about 90° C. to about 100° C., or about 95° C. to about 100° C.

The polyolefin composition or film thereof has a hot tack window temperature at 5 N of about 35° C., about 38° C., about 40° C., about 45° C., or about 50° C. to about 55° C., about 60° C., about 65° C., about 68° C., about 70° C., about 72° C., about 75° C., about 78° C., about 80° C., about 85° C., or about 90° C. For example, the polyolefin composition or film thereof has a hot tack window temperature at 5 N of about 35° C. to about 90° C., about 35° C. to about 85° C., about 35° C. to about 82° C., about 35° C. to about 80° C., about 35° C. to about 78° C., about 35° C. to about 75° C., about 35° C. to about 72° C., about 35° C. to about 70° C., about 35° C. to about 68° C., about 35° C. to about 65° C., about 35° C. to about 65° C., about 38° C. to about 90° C., about 38° C. to about 85° C., about 38° C. to about 82° C., about 38° C. to about 80° C., about 38° C. to about 78° C., about 38° C. to about 75° C., about 38° C. to about 72° C., about 38° C. to about 70° C., about 38° C. to about 68° C., about 38° C. to about 65° C., about 38° C. to about 65° C., about 40° C. to about 90° C., about 40° C. to about 85° C., about 40° C. to about 82° C., about 40° C. to about 80° C., about 40° C. to about 78° C., about 40° C. to about 75° C., about 40° C. to about 72° C., about 40° C. to about 70° C., about 40° C. to about 68° C., about 40° C. to about 65° C., about 40° C. to about 65° C., about 45° C. to about 90° C., about 45° C. to about 85° C., about 45° C. to about 82° C., about 45° C. to about 80° C., about 45° C. to about 78° C., about 45° C. to about 75° C., about 45° C. to about 72° C., about 45° C. to about 70° C., about 45° C. to about 68° C., about 45° C. to about 65° C., or about 45° C. to about 65° C.

The polyolefin composition or film thereof has a maximum hot tack force of about 4 N, about 5 N, about 6 N, about 8 N, or about 10 N to about 12 N, about 15 N, about 18 N, about 20 N, or about 22 N. For example, the polyolefin composition or film thereof has a maximum hot tack force of about 4 N to about 22 N, about 5 N to about 22 N, about 5 N to about 20 N, about 5 N to about 15 N, or about 5 N to about 10 N.

In one or more embodiments, a polyolefin composition contains about 40 wt % to about 60 wt % of a HDPE and about 40 wt % to about 60 wt % of a LLDPE, by weight of the polyolefin composition. The HDPE has a density of greater than 0.93 g/cm$^3$ and the LLDPE has a density of less than 0.915 g/cm$^3$ and a branching index ($g'_{vis}$) of about 0.95 or greater. The polyolefin composition has a density of about 0.915 g/cm$^3$ to about 0.935 g/cm$^3$, a melt index of about 0.5 dg/min to about 6 dg/min, such as about 0.8 dg/min to about 2 dg/min, a $T_{w1}-T_{w2}$ value of about −60° C. to about −25° C., a 1% Secant average value of about 30,000 psi to about 44,000 psi, an Elmendorf Tear value in the machine direction of about 320 g/mil to about 500 g/mil, an Elmendorf Tear value in the transverse direction of about 475 g/mil to about 700 g/mil, and a seal temperature at 1 N of about 70° C. to about 85° C. and/or at 5 N of about 80° C. to about 95° C.

In some embodiments, a polyolefin composition contains about 40 wt % to about 60 wt % of a HDPE, about 40 wt % to about 60 wt % of a LLDPE, and an additive at a concentration of about 0.001 wt % to about 2 wt %, by weight of the polyolefin composition. The HDPE has a density of greater than 0.93 g/cm$^3$ and the LLDPE has a density of less than 0.915 g/cm$^3$. The polyolefin composition has a density of about 0.915 g/cm$^3$ to about 0.935 g/cm$^3$, a $T_{w1}-T_{w2}$ value of about −60° C. to about −25° C., an Elmendorf Tear value in the machine direction of about 320 g/mil to about 500 g/mil, an Elmendorf Tear value in the transverse direction of about 475 g/mil to about 700 g/mil, and a seal temperature at 1 N of about 70° C. to about 85° C. and/or at 5 N of about 80° C. to about 95° C.

Ethylene Polymers

In one or more embodiments, the ethylene polymer is selected from ethylene homopolymer, ethylene copolymers, and blends thereof. Useful copolymers contain one or more comonomers in addition to ethylene and can be a random copolymer, a statistical copolymer, a block copolymer, and/ or blends thereof. In particular, the ethylene polymer blends described herein may be physical blends or in situ blends of more than one type of ethylene polymer or blends of ethylene polymers with polymers other than ethylene polymers where the ethylene polymer component is the majority component (e.g., greater than 50 wt %). The method of making the polyethylene is not critical, as it can be made by slurry, solution, gas phase, high pressure, or other suitable processes, and by using catalyst systems appropriate for the polymerization of polyethylenes, such as Ziegler-Natta-type catalysts, chromium catalysts, metallocene-type catalysts, other appropriate catalyst systems, or combinations thereof, or by free-radical polymerization. In one or more embodiments, the ethylene polymers are made by the catalysts, activators, and processes described in U.S. Pat. Nos. 6,342,566; 6,384,142; 5,741,563; PCT publications WO 2003/040201; and WO 1997/019991. Such catalysts are well known in the art, and are described in, for example, ZIEGLER CATALYSTS (Gerhard Fink, Rolf Mulhaupt and Hans H. Brintzinger, eds., Springer-Verlag 1995); Resconi et al.; and I, II METALLOCENE-BASED POLYOLEFINS (Wiley & Sons 2000).

Exemplary ethylene polymers and copolymers that are useful in embodiments described and discussed herein include those sold by ExxonMobil Chemical Company in Houston Tex., including those sold as ExxonMobil HDPE, ExxonMobil LLDPE, and ExxonMobil LDPE; and those sold under the ENABLE™, EXACT™, EXCEED™ ESCORENE™, EXXCO™, ESCOR™, PAXON™, and OPTEMA™ tradenames.

In some embodiments, the ethylene polymer contains olefin block copolymers as described in EP 1716190. In other embodiments, the ethylene polymer is produced using chrome based catalysts, such as, for example, in U.S. Pat. No. 7,491,776, including that fluorocarbon does not have to be used in the production. Commercial examples of polymers produced by chromium include the Paxon™ grades of polyethylene produced by ExxonMobil Chemical Company, Houston Tex.

In other embodiments, the ethylene polymer contains ethylene and an optional comonomer of propylene, butene, pentene, hexene, octene, nonene, or decene, and said polymer has a density of more than 0.86 to less than 0.910 g/cm$^3$, an Mw of 20,000 g/mol or greater (50,000 g/mol or greater).

In other embodiments, the ethylene polymer contains substantially linear and linear ethylene polymers (SLEPs). Substantially linear ethylene polymers and linear ethylene polymers and their method of preparation are fully described in U.S. Pat. Nos. 5,272,236; 5,278,272; 3,645,992; 4,937,299; 4,701,432; 4,937,301; 4,935,397; 5,055,438; EP 129368; EP 260999; and WO 1990/007526. As used herein, "a linear or substantially linear ethylene polymer" means a homopolymer of ethylene or a copolymer of ethylene and one or more alpha-olefin comonomers having a linear backbone (e.g., no cross linking), a specific and limited amount of long-chain branching or no long-chain branching, a narrow molecular weight distribution, a narrow composition distribution (e.g., for alpha-olefin copolymers) or a combination thereof. More explanation of such polymers is discussed in U.S. Pat. No. 6,403,692.

In one or more embodiments, the ethylene polymer is an HDPE having a density of greater than 0.93 g/cm$^3$, a branching index ($g'_{vis}$) of about 0.95 or greater, and a melt index of about 0.2 dg/min to about 10 dg/min, such as about 0.5 dg/min to about 2 dg/min. In some examples, the HDPE has an Mw/Mn of about 1 to about 8 and the LLDPE has an Mw/Mn of about 1 to about 8. The ethylene polymer is an LLDPE having a density of less than 0.915 g/cm$^3$, a branching index ($g'_{vis}$) of about 0.95 or greater, and a melt index of about 0.2 dg/min to about 10 dg/min, such as about 0.5 dg/min to about 2 dg/min.

Exemplary ethylene homopolymers and copolymers useful to produce the polyethylene compositions described and discussed herein can have:

1. an $M_w$ of 20,000 g/mol or greater, such as 20,000 to 1,000,000 g/mol, 30,000 to 750,000 g/mol, 40,000 to 500,000 g/mol, 50,000 to 250,000 g/mol, 70,000 to 200,000 g/mol, or 80,000 to 150,000 g/mol, as measured by size exclusion chromatography according to the procedure described and discussed below; and/or 2. an $M_w/M_n$ of 1 to 40, 1 to 8, 1.6 to 20, 1.8 to 10, 1.8 to 4, 1.8 to 3, as measured by size exclusion chromatography as described below in the Test Methods section; and/or 3. a $T_m$ of 30° C. to 150° C., 30° C. to 140° C., 50° C. to 140° C., 60° C. to 135° C., 80° C. to 135° C., 90° C. to 135° C., 100° C. to 135° C., 100° C. to 130° C., 100° C. to 125° C., or 100° C. to 120° C., as measured by the DSC method described below; and/or 4. a crystallinity of 5% to 80%, 10% to 70%, 20% to 60% (alternatively, the polyethylene may have a crystallinity of at least 30%, at least 40%, alternatively at least 50%, as measured by the DSC method described below; and/or 5. a heat of fusion of 300 J/g or less, 1 to 260 J/g, 5 to 240 J/g, 10 to 200 J/g, 70 to 160 J/g, 70 to 140 J/g, 70 to 130 J/g, 85 to 160 J/g, 85 to 140 J/g, 85 to 130 J/g, or 95 to 160 J/g, as measured by the DSC method described below; and/or 6. a crystallization temperature (Tc) of 15° C. to 130° C., 20° C. to 120° C., 25° C. to 110° C., 25° C. to 60° C., 25° C. to 45° C., 60° C. to 125° C., as measured by the DSC method described below; and/or 7. a heat deflection temperature of 30° C. to 120° C., 40° C. to 100° C., 50° C. to 80° C., as measured according to ASTM D648 on injection molded flexure bars, at 66 psi load (455 kPa); and/or 8. a Shore hardness (D scale) of 10 or greater, 20 or greater, 30 or greater, 40 or greater, 100 or less, from 25 to 75 (as measured by ASTM D 2240); and/or 9. a percent amorphous content of at least 50%, alternatively at least 60%, alternatively at least 70%, even alternatively between 50% and 95%, or 70% or less, 60% or less, 50% or less, as determined by subtracting the percent crystallinity from 100 where % crystallinity is determined by the DSC method described below; and/or 10. a branching index ($g'_{vis}$) of 0.97 or greater, 0.98 or greater, 0.99 or greater, 1, as measured using the method described below in the Test Methods section; and/or 11. a density of 0.860 to 0.980 g/cm$^3$ (from 0.880 to 0.940 g/cm$^3$, from 0.900 to 0.935 g/cc, from 0.910 to 0.930 g/cm$^3$) (alternately from 0.85 to 0.97 g/cm$^3$, 0.86 to 0.965 g/cm$^3$, 0.88 to 0.96 g/cm$^3$, alternatively between 0.860 and 0.910 g/cm$^3$, alternatively between 0.910 and 0.940 g/cm$^3$, or alternatively between 0.94 to 0.965 g/cm$^3$) (determined according to ASTM D 1505 using a density-gradient column on a compression-molded specimen that has been slowly cooled to room temperature (e.g., over a period of 10 minutes or greater) and allowed to age for a sufficient time that the density is constant within +/−0.001 g/cm$^3$).

The polyethylene may be an ethylene homopolymer, such as HDPE. In other embodiments, the ethylene homopolymer has a molecular weight distribution ($M_w/M_n$) of up to 40, for example, ranging from 1 to 8, from 1.5 to 20, from 1.8 to 10, from 1.9 to 5, or from 2.0 to 4. In other embodiments, the 1% secant flexural modulus (determined according to ASTM D-882-10) of the ethylene polymer falls in a range of 200 to 1,000 MPa, such from 300 to 800 MPa in other embodiments, and from 400 to 750 MPa in other embodiments, wherein a desirable polymer may exhibit any combination of any upper flexural modulus limit with any lower flexural modulus limit. The melt index (MI) of ethylene homopolymers range from 0.05 to 800 dg/min in one embodiment and from 0.1 to 100 dg/min, in other embodiments, as measured according to ASTM D1238 (190° C., 2.16 kg).

In one or more embodiments, the polyethylene contains less than 20 mol % propylene units (less than 15 mol %, less than 10 mol %, less than 5 mol %, 0 mol % propylene units).

In some embodiments, the ethylene polymer is an ethylene copolymer, either random or block, of ethylene and one or more comonomers selected from $C_3$ to $C_{20}$ α-olefins, typically from $C_3$ to $C_{10}$ α-olefins in another embodiment. In some examples, the comonomers are present from 0.1 wt % to 50 wt % of the copolymer in one embodiment, from 0.5 wt % to 30 wt % in other embodiments, from 1 wt % to 15 wt % in other embodiments, and from 0.1 wt % to 5 wt % in other embodiments, wherein a desirable copolymer contains ethylene and $C_3$ to $C_{20}$ α-olefin derived units in any combination of any upper wt % limit with any lower wt % limit described herein. In some examples, the ethylene copolymer will have a weight average molecular weight of from greater than 8,000 g/mol in one embodiment, greater than 10,000 g/mol in other embodiments, greater than 12,000 g/mol in other embodiments, greater than 20,000 g/mol in other embodiments, and less than 1,000,000 g/mol in other embodiments, less than 800,000 g/mol in other embodiments, wherein a desirable copolymer may contain any upper molecular weight limit with any lower molecular weight limit described herein. In one or more examples, the ethylene copolymer will have a weight average molecular weight of greater than 50,000 g/mol, such as about 60,000 g/mol, about 80,000 g/mol, about 90,000 g/mol, about 100,000 g/mol, or about 110,000 g/mol to about 120,000 g/mol, about 130,000 g/mol, about 150,000 g/mol, or about 180,000 g/mol.

In other embodiments, the ethylene copolymer contains ethylene and one or more other monomers selected from the group consisting of $C_3$ to $C_{20}$ linear, branched or cyclic monomers, and in some embodiments is a $C_3$ to $C_{12}$ linear or branched alpha-olefin, butene, pentene, hexene, heptene, octene, nonene, decene, dodecene, 4-methyl-pentene-1, 3-methyl pentene-1, 3,5,5-trimethyl-hexene-1, and the like. The monomers may be present at up to 50 wt %, from 0 wt % to 40 wt %, more from 0.5 wt % to 30 wt %, more from 2 wt % to 30 wt %, more from 5 wt % to 20 wt %.

Exemplary linear alpha-olefins useful as comonomers for the ethylene copolymers useful in embodiments described and discussed herein include $C_3$ to $C_8$ alpha-olefins, 1-butene, 1-hexene, and 1-octene, 1-hexene. Exemplary branched alpha-olefins include 4-methyl-1-pentene, 3-methyl-1-pentene, 3,5,5-trimethyl-1-hexene, and 5-ethyl-1-nonene. Exemplary aromatic-group-containing monomers contain up to 30 carbon atoms. Suitable aromatic-group-containing monomers contain at least one aromatic structure, from one to three, a phenyl, indenyl, fluorenyl, or naphthyl moiety. The aromatic-group-containing monomer further contains at least one polymerizable double bond such that after polymerization, the aromatic structure will be pendant from the polymer backbone. The aromatic-group containing monomer may further be substituted with one or more hydrocarbyl groups including $C_1$ to $C_{10}$ alkyl groups. Additionally, two adjacent substitutions may be joined to form a ring structure. Exemplary aromatic-group-containing monomers contain at least one aromatic structure appended to a polymerizable olefinic moiety. Particularly, exemplary aromatic monomers include styrene, alpha-methylstyrene, para-alkylstyrenes, vinyltoluenes, vinylnaphthalene, allyl benzene, and indene; especially styrene, paramethyl styrene, 4-phenyl-1-butene, and allyl benzene.

Diolefin monomers useful in embodiments described and discussed herein include any hydrocarbon structure, $C_4$ to $C_{30}$, having at least two unsaturated bonds, wherein at least two of the unsaturated bonds are readily incorporated into a polymer by either a stereospecific or a non-stereospecific catalyst(s). The diolefin monomers can be selected from alpha, omega-diene monomers (e.g., di-vinyl monomers). In some examples, the diolefin monomers are linear di-vinyl monomers, most those containing from 4 to 30 carbon atoms. Examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (M, of less than 1,000 g/mol). Exemplary cyclic dienes include cyclopentadiene, vinylnorbornene, norbornadiene, ethylidene norbornene, divinylbenzene, dicyclopentadiene or higher ring containing diolefins with or without substituents at various ring positions.

In one or more embodiments, the ethylene polymer used herein is a plastomer having a density of 0.91 g/cm³ or less, as determined by ASTM D1505, and a melt index (MI) between 0.1 and 50 dg/min, as determined by ASTM D1238 (190° C., 2.16 kg). In some embodiments, the useful plastomer is a copolymer of ethylene and at least one $C_3$ to $C_{12}$ α-olefin, $C_4$ to $C_8$ α-olefins. The amount of $C_3$ to $C_{12}$ α-olefin present in the plastomer ranges from 2 wt % to 35 wt % in one or more embodiments, from 5 wt % to 30 wt % in other embodiments, from 15 wt % to 25 wt % in other embodiments, and from 20 wt % to 30 wt % in yet another embodiment.

Plastomers useful have a melt index of between 0.1 and 40 dg/min in one embodiment, from 0.2 to 20 dg/min. In other embodiments, and from 0.5 to 10 dg/min in yet another embodiment. The average molecular weight of plastomers ranges from 10,000 to 800,000 g/mole in one embodiment and from 20,000 to 700,000 g/mole in another embodiment. The 1% secant flexural modulus (ASTM D-882-10) of plastomers ranges from 5 MPa to 100 MPa in one embodiment and from 10 MPa to 50 MPa in another embodiment. Further, plastomers that are useful in polyolefin compositions have a melting temperature ($T_m$) from 30° C. to 100° C. in one embodiment and from 40° C. to 80° C. in another embodiment. The degree of crystallinity of plastomers is between 3% and 30%.

Particularly plastomers useful are synthesized using a single-site catalyst, such as a metallocene catalyst; contain copolymers of ethylene and higher α-olefins such as propylene, 1-butene, 1-hexene, and 1-octene, and which contain enough of one or more of these comonomer units to yield a density between 0.86 and 0.91 g/cm³ in one embodiment. The molecular weight distribution ($M_w/M_n$) of desirable plastomers ranges from 1.5 to 5 in one embodiment and from 2.0 to 4 in another embodiment. Examples of commercially available plastomers are EXACT™ 4150, a copolymer of ethylene and 1-hexene, the 1-hexene derived units making up from 18 wt % to 22 wt % of the plastomer and having a density of 0.895 g/cm³ and MI of 3.5 dg/min (ExxonMobil Chemical Company, Houston, Tex.); EXACT™ 8201, a copolymer of ethylene and 1-octene, the 1-octene derived units making up from 26 wt % to 30 wt % of the plastomer; and having a density of 0.882 g/cm³ and MI of 1.0 dg/min (ExxonMobil Chemical Company, Houston, Tex.).

The melt index (MI) of ethylene polymers, as measured according to ASTM D1238 (190° C., 2.16 kg), ranges from 0.02 dg/min to 800 dg/min in some embodiments, or from 0.05 dg/min to 500 dg/min and/or from 0.1 dg/min to 100 dg/min in other embodiments. In some embodiments, the polyethylene has a MI of 20 dg/min or less, 7 dg/min or less, 5 dg/min or less, or 2 dg/min or less, or less than 2 dg/min. In other embodiments, the polymer has a Mooney viscosity, ML(1+4) @ 125° C. (measured according to ASTM D1646) of 100 or less, 75 or less, 60 or less, or 30 or less.

In other embodiments, the 1% secant flexural modulus of ethylene polymers ranges from about 5 MPa to about 1,000 MPa, from about 10 MPa to about 800 MPa, or from about 80 MPa to about 500 MPa, in other embodiments, and from about 5 MPa to about 200 MPa in other embodiments, wherein a desirable polymer may exhibit any combination of any upper flexural modulus limit with any lower flexural modulus limit. The 1% secant flexural modulus values are determined by the ASTM D-882 standard modified per details listed below in Table 1.

The crystallinity of the ethylene polymer may also be expressed in terms of crystallinity percent. In some examples, the ethylene polymer has a percent crystallinity within the range having an upper limit of 80%, 60%, 40%, 30%, or 20%, and a lower limit of 1%, 3%, 5%, 8%, or 10%. Alternately, the ethylene polymer has a percent crystallinity of 5% to 80%, 10% to 70%, 20% to 60%. Alternatively, the ethylene polymer may have a percent crystallinity of at least 30%, at least 40%, alternatively at least 50%, where crystallinity is determined by DSC as described below.

The level of crystallinity may be reflected in the melting point. In one or more embodiments, the ethylene polymer has a single melting point. Typically, a sample of ethylene copolymer will show secondary melting peaks adjacent to the principal peak, which is considered together as a single melting point. The highest of these peaks is considered the melting point. The polymer has a melting point ranging from an upper limit of 150° C., 130° C., or 100° C. to a lower limit of 0° C., 30° C., 35° C., 40° C., or 45° C., as determined by DSC as described below.

In one or more embodiments, ethylene copolymers useful herein are a copolymer containing at least 50 wt % ethylene and having up to 50 wt %, 1 wt % to 35 wt %, 1 wt % to 6 wt % of a $C_3$ to $C_{20}$ comonomer (hexene or octene), based upon the weight of the copolymer. In some examples, these ethylene polymer are metallocene polyethylenes (mPEs).

Further useful mPEs include those described in US Patent Application Publication No. 2007/0260016 and U.S. Pat. No. 6,476,171, e.g., copolymers of an ethylene and at least one alpha olefin having at least 5 carbon atoms obtainable by a continuous gas phase polymerization using supported catalyst of an activated molecularly discrete catalyst in the substantial absence of an aluminum alkyl based scavenger (e.g., triethylaluminum, trimethylaluminum, tri-isobutyl aluminum, tri-n-hexylaluminum, and the like), which polymer has a Melt Index of from 0.1 to 15 (ASTM D 1238, condition E, (190° C., 2.16 kg)); a Haze (ASTM D1003) value of less than 20; a Melt Index ratio (I21/I1, ASTMD 1238) of from 35 to 80; an averaged Modulus (M) (as described and discussed in U.S. Pat. No. 6,255,426) of from 20,000 to 60,000 psi (13790 to 41369 N/cm²) and a relation between M and the Dart Impact Strength (26 inch, ASTM D 1709) in g/mil (DIS) complying with the formula:

$$DIS \geq 0.8 \times [100 + e^{(11.71 - 0.000268 \times M + 2.183 \times 10^{-9} \times M^2)}],$$

where "e" represents 2.1783, the base Napierian logarithm; M is the averaged Modulus in psi; and DIS is the 26 inch (66 cm) dart impact strength.

Useful mPE homopolymers or copolymers may be produced using mono- or bis-cyclopentadienyl transition metal catalysts in combination with an activator of alumoxane and/or a non-coordinating anion in solution, slurry, high pressure, or gas phase. The catalyst and activator may be supported or unsupported and the cyclopentadienyl rings by may substituted or unsubstituted. Several commercial products produced with such catalyst/activator combinations are commercially available from ExxonMobil Chemical Company in Baytown, Tex. under the tradename EXCEED™ Polyethylene or ENABLE™ Polyethylene.

Additives

The polyolefin compositions may also contain other additives. Those additives include antioxidants, nucleating agents, acid scavengers, stabilizers, anticorrosion agents, plasticizers, blowing agents, cavitating agents, surfactants, adjuvants, block, antiblock, UV absorbers such as chain-breaking antioxidants, oils, etc., quenchers, antistatic agents, slip agents, processing aids, UV stabilizers, neutralizers, lubricants, waxes, color masterbatches, pigments, dyes and fillers, and cure agents such as peroxide. In one or more embodiments, the additives may each individually present at 0.01 wt % to 50 wt % in one embodiment, from 0.01 wt % to 10 wt % in other embodiments, and from 0.1 wt % to 6 wt % in other embodiments, based upon the weight of the composition. In one or more embodiments, dyes and other colorants common in the industry may be present from 0.01 wt % to 10 wt % in one embodiment and from 0.1 wt % to 6 wt % in other embodiments, based upon the weight of the composition. Exemplary fillers, cavitating agents and/or nucleating agents include titanium dioxide, calcium carbonate, barium sulfate, silica, silicon dioxide, carbon black, sand, glass beads, mineral aggregates, talc, clay, and the like.

In particular, antioxidants and stabilizers such as organic phosphites, hindered amines, and phenolic antioxidants may be present in the polyolefin compositions from 0.001 wt % to 2 wt %, based upon the weight of the composition in one embodiment, from 0.01 wt % to 0.8 wt % in other embodiments, and from 0.02 wt % to 0.5 wt % in yet another embodiment. Non-limiting examples of organic phosphites that are suitable are tris(2,4-di-tert-butylphenyl)phosphite (IRGAFOS 168) and di(2,4-di-tert-butylphenyl)pentaerithritol diphosphite (ULTRANOX 626). Non-limiting examples of hindered amines include poly[2-N,N'-di(2,2,6,6-tetramethyl-4-piperidinyl)-hexanediamine-4-(1-amino-1,1,3,3-tetramethylbutane)sym-triazine] (CHIMASORB 944); bis(1,2,2,6,6-pentamethyl-4-piperidyl)sebacate (TINUVIN 770). Non-limiting examples of phenolic antioxidants (e.g., sterically hindered phenolics) include octadecyl-3-(3,5-di-tertbutyl-4-hydroxyphenyl)-propionate (IRGANOX-1076); pentaerythrityl tetrakis(3,5-di-tert-butyl-4-hydroxyphenyl) propionate (IRGANOX 1010); and 1,3,5-tri(3,5-di-tert-butyl-4-hydroxybenzyl-isocyanurate (IRGANOX 3114); a fluoropolymer, a fluoroelastomer, mixtures containing the same (e.g., mixture of polyethylene glycol and one or more fluoroelastomers) (DYNAMAR™ FX5920A); derivatives thereof, or any combination thereof. In one or more examples, the film or the polyolefin composition contains the additive at a concentration of about 0.001 wt % to about 2 wt %, based on the weight of the polyolefin composition.

Fillers may be present from 0.001 wt % to 50 wt % in one embodiment, from 0.01 wt % to 25 wt % in other embodiments, and from 0.2 wt % to 10 wt % in other embodiments, based upon the weight of the composition. Desirable fillers can be or include titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, dolomite, calcium carbonate, talc and hydrotalcite compounds of the ions Mg, Ca, or Zn with Al, Cr or Fe and $CO_3$, and/or $HPO_4$, hydrated or not; quartz powder, hydrochloric magnesium carbonate, glass fibers, clays, alumina, and other metal oxides and carbonates, metal hydroxides, chrome, phosphorous and brominated flame retardants, antimony trioxide, silica, silicone, and blends thereof. These fillers may particularly include any other fillers and porous fillers and supports known in the art, and may have the modifier pre-contacted, or pre-absorbed into the filler prior to addition to the ethylene polymer in one embodiment. In one or more examples, the film or the polyolefin composition contains the filler at a concentration of about 0.001 wt % to about 2 wt %, based on the weight of the polyolefin composition.

Metal salts of fatty acids may also be present in the polyolefin compositions. Such salts may be present from 0.001 wt % to 1 wt % of the composition in one embodiment and from 0.01 wt % to 0.8 wt % in another embodiment. Examples of fatty acids include lauric acid, stearic acid, succinic acid, stearyl lactic acid, lactic acid, phthalic acid, benzoic acid, hydroxystearic acid, ricinoleic acid, naphthenic acid, oleic acid, palmitic acid, erucic acid, any monocarboxylic aliphatic saturated or unsaturated acid having a chain length of 7 to 22 carbon atoms, esters thereof, salts thereof, or any combination thereof. Suitable metals include Li, Na, Mg, Ca, Sr, Ba, Zn, Cd, Al, Sn, Pb, and so forth. In some examples, metal salts of fatty acids are magnesium stearate, calcium stearate, sodium stearate, zinc stearate, calcium oleate, zinc oleate, and magnesium oleate.

In one or more embodiments, slip additives may be present in the polyolefin compositions. In some examples, the slip additives are present at 0.001 wt % to 1 wt % (10 ppm to 10,000 ppm), 0.01 wt % to 0.5 wt % (100 ppm to 5,000 ppm), 0.1 wt % to 0.3 wt % (1,000 ppm to 3,000 ppm), based upon the weight of the composition. Desirable slip additives can be or include saturated fatty acid amides (such as palmitamide, stearamide, arachidamide, behenamide, stearyl stearamide, palmityl pamitamide, and stearyl arachidamide); saturated ethylene-bis-amides (such as stearamido-ethyl-stearamide, stearamido-ethyl-palmitamide, and palmitamido-ethyl-stearamide); unsaturated fatty acid amides (such as oleamide, erucamide, and linoleamide); unsaturated ethylene-bis-amides (such as ethylene-bis-stearamide, ethylene-bis-oleamide, stearyl-erucamide, erucamido-ethyl-erucamide, oleamido-ethyl-oleamide, erucamido-ethyl-oleamide, oleamido-ethy-lerucamide, stearamido-ethyl-erucamide, erucamido-ethyl-palmitamide, and palmitamido-ethyl-oleamide); glycols; polyether polyols (such as Carbowax); acids of aliphatic hydrocarbons (such as adipic acid and sebacic acid); esters of aromatic or aliphatic hydrocarbons (such as glycerol monostearate and pentaerythritol monooleate); styrene-alpha-methyl styrene; fluoro-containing polymers (such as polytetrafluoroethylene, fluorine oils, and fluorine waxes); silicon compounds (such as silanes and silicone polymers, including silicone oils, modified silicones and cured silicones); sodium alkylsulfates, alkyl phosphoric acid esters; and mixtures thereof. Exemplary slip additives are unsaturated fatty acid amides, which are commercially available from Crompton (KEKAMIDE™ slip additives), Croda Universal (CRODAMIDE™ slip additives), and Akzo Nobel Amides Co. Ltd. (ARMOSLIP™ slip additives). Particularly, slip agents include unsaturated fatty acid amides having the chemical structure:

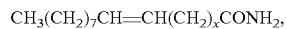

$$CH_3(CH_2)_7CH=CH(CH_2)_xCONH_2,$$

where x is 5 to 15. Exemplary versions include: 1) Erucamide, where x is 11, also referred to as cis-13-docosenoamide (commercially available as ARMOSLIP E); 2) Oleylamide, where x is 8; and 3) Oleamide, where x is 7, also referred to as N-9-octadecenyl-hexadecanamide. In other embodiments, stearamide is also an exemplary slip additive. Other slip additives include those described in WO 2004/005601A1.

In some embodiments, the polyethylene and/or polyolefin compositions described and discussed herein may be blended with one or more other polymers including thermoplastic polymer(s) and/or elastomer(s).

By "thermoplastic polymer(s)" is meant a polymer that can be melted by heat and then cooled without appreciable change in solid-state properties before and after heating. Thermoplastic polymers typically include polyolefins, polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, or mixtures of two or more of the above. Polyolefins include polymers containing one or more linear, branched or cyclic $C_2$ to $C_{40}$ olefins, polymers containing ethylene copolymerized with one or more $C_3$ to $C_{40}$ olefins, a $C_3$ to $C_{20}$ alpha olefin, $C_3$ to $C_{10}$ alpha-olefins. A particularly example is polybutene. In some examples, the polyolefin is polypropylene. Exemplary polyolefins include polymers containing ethylene including ethylene copolymerized with a $C_3$ to $C_{40}$ olefin, a $C_3$ to $C_{20}$ alpha olefin, propylene, butene, hexene, and/or octene.

By "elastomers" is meant all natural and synthetic rubbers, including those defined in ASTM D1566. Examples of elastomers include ethylene propylene rubber, ethylene propylene diene monomer rubber, styrenic block copolymer rubbers (including SEBS, SI, SIS, SB, SBS, SIBS, and the like, where S=styrene, EB=random ethylene+butene, I=isoprene, and B=butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, and polybutadiene rubber (both cis and trans).

In other embodiments, the blend containing the modifier may further be combined with one or more polymers polymerizable by a high-pressure free radical process, polyvinylchloride, polybutene-1, isotactic polybutene, ABS resins, block copolymer, styrenic block copolymers, polyamides, polycarbonates, PET resins, crosslinked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

Tackifiers may be blended with the polyolefin compositions. Examples of useful tackifiers include aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes, modified terpenes, and hydrogenated rosin esters. In some embodiments, the tackifier is hydrogenated. In other embodiments, the tackifier is non-polar. (Non-polar is meant that the tackifier is substantially free of monomers having polar groups. In some examples, the polar groups are not present; however, if the polar groups are present, the polar groups are present at less than 5 wt %, less than 2 wt %, less than 0.5 wt %, or as little as about 1 ppm, based upon the weight of the tackifier.) In some embodiments, the tackifier has a softening point (Ring and Ball, as measured by ASTM E-28) of 80° C. to 140° C., 100° C. to 130° C. The tackifier, if present, is typically present at 1 wt % to 50 wt %, based upon the weight of the blend, 10 wt % to 40 wt %, 20 wt % to 40 wt %. In some examples, however, tackifier is not present, or if present, is present at less than 10 wt %, less than 5 wt %, at less than 1 wt %.

Blending and Processing

The compositions and blends described herein may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from BASF); phosphites (e.g., IRGAFOS™ 168 available from BASF); anti-cling additives; tackifiers, such as polybutenes, terpene resins, aliphatic and aromatic hydrocarbon resins, alkali metal and glycerol stearates and hydrogenated rosins; UV stabilizers; heat stabilizers; antiblocking agents; release agents; anti-static agents; pigments; colorants; dyes; waxes; silica; fillers; talc; and the like.

The polymers suitable for use can be in any physical form when used to blend with the modifier. In one embodiment, reactor granules, defined as the granules of polymer that are isolated from the polymerization reactor prior to any processing procedures, are used to blend with the modifier. The reactor granules typically have an average diameter of from 50 μm to 10 mm in one embodiment, and from 10 μm to 5 mm in another embodiment. In other embodiments, the polymer is in the form of pellets, such as, for example, having an average diameter of from 1 mm to 10 mm that are formed from melt extrusion of the reactor granules.

The components can be blended by any suitable means, and are typically blended to yield an intimately mixed composition which may be a homogeneous, single phase mixture. For example, they may be blended in a static mixer, batch mixer, extruder, or a combination thereof, that is sufficient to achieve an adequate dispersion of modifier in the polymer.

The mixing step may involve first dry blending using, for example, a tumble blender, where the polymer and modifier are brought into contact first, without intimate mixing, which may then be followed by melt blending in an extruder. Another method of blending the components is to melt blend the polymer pellets with the modifier directly in an extruder or batch mixer. It may also involve a "master batch" approach, where the final modifier concentration is achieved by combining neat polymer with an appropriate amount of modified polymer that had been previously prepared at a higher modifier concentration. The mixing step may take place as part of a processing method used to fabricate articles, such as in the extruder on an injection molding machine or blown-film line or fiber line.

In one or more embodiments, the polyolefin composition and/or ethylene polymer may also be "dry blended" with the modifier using a tumbler, double-cone blender, ribbon blender, or other suitable blender. Alternatively, in other embodiments, the polyolefin composition and/or ethylene polymer and modifier are "melt blended" in an apparatus such as an extruder (single or twin screw) or batch mixer. In other embodiments, the polyolefin composition and/or ethylene polymer and modifier are blended by a combination of approaches, for example a tumbler followed by an extruder. An exemplary method of blending is to include the final stage of blending as part of an article fabrication step, such as in the extruder used to melt and convey the composition for a molding step like injection molding or blow molding. This could include direct injection of the modifier into the extruder, either before or after the polyethylene is fully melted. Extrusion technology for polyethylene is described in more detail in, for example, PLASTICS EXTRUSION TECHNOLOGY 26-37 (Friedhelm Hensen, ed. Hanser Publishers 1988).

In other embodiments, the polyethylene composition may be blended in solution by any suitable means, by using a solvent that dissolves both components to a significant extent. The blending may occur at any temperature or pressure where the modifier and the ethylene polymer remain in solution. Exemplary conditions include blending at high temperatures, such as 10° C. or greater, 20° C. or greater, over the melting point of the ethylene polymer. Such solution blending would be particularly useful in processes where the ethylene polymer is made by solution process and the modifier is added directly to the finishing train, rather than added to the dry polymer in another blending step altogether. Such solution blending would also be particularly useful in processes where the ethylene polymer is made in a bulk or high pressure process where both the polymer and the modifier were soluble in the monomer. As with the solution process, the modifier is added directly to the finishing train, rather than added to the dry polymer in another blending step altogether.

Thus, in the cases of fabrication of articles using methods that involve an extruder, such as injection molding or blow molding, any means of combining the polyethylene compositions to achieve the desired composition serve equally well as fully formulated pre-blended pellets, since the forming process includes a re-melting and mixing of the raw material; example combinations include simple blends of neat polymer pellets and modifier, of neat polymer granules and modifier, of neat polymer pellets and pre-blended pellets, and neat polymer granules and pre-blended pellets. Here, "pre-blended pellets" means pellets of a polyethylene composition containing ethylene polymer and modifier at some concentration. In the process of compression molding, however, little mixing of the melt components occurs, and pre-blended pellets could be used over simple blends of the constituent pellets (or granules) and modifier. Those skilled in the art will be able to determine the appropriate procedure for blending of the polymers to balance the need for intimate mixing of the component ingredients with the desire for process economy.

Applications

The enhanced properties of the polyethylene compositions described and discussed herein are useful in a wide variety of applications, including transparent articles such as cook and storage ware, and in other articles such as furniture, automotive components, toys, sportswear, medical devices, sterilizable medical devices and sterilization containers, nonwoven fibers and fabrics and articles therefrom such as drapes, gowns, filters, hygiene products, diapers, films, oriented films, sheets, tubes, pipes, and other items where softness, high impact strength, and impact strength below freezing is important.

Additional examples of desirable articles of manufacture made from polyolefin compositions include films, sheets, fibers, woven and nonwoven fabrics, automotive components, furniture, sporting equipment, food storage containers, transparent and semi-transparent articles, toys, tubing and pipes, sheets, packaging, bags, sacks, coatings, caps, closures, crates, pallets, cups, non-food containers, pails, insulation, and medical devices. Further examples include automotive components, wire and cable jacketing, pipes, agricultural films, geomembranes, toys, sporting equipment, medical devices, casting and blowing of packaging films, extrusion of tubing, pipes and profiles, sporting equipment, outdoor furniture (e.g., garden furniture) and playground equipment, boat and water craft components, and other such articles. In particular, the polyolefin compositions are suitable for automotive components such as bumpers, grills, trim parts, dashboards and instrument panels, exterior door and hood components, spoiler, wind screen, hub caps, mirror housing, body panel, protective side molding, and other interior and external components associated with automobiles, trucks, boats, and other vehicles.

The polyolefin compositions can also be used to manufacture other articles and goods, such as crates, containers, packaging, labware, such as roller bottles for culture growth and media bottles, office floor mats, instrumentation sample holders and sample windows; liquid storage containers such as bags, pouches, and bottles for storage and IV infusion of blood or solutions; and packaging material including those for any medical device or drugs including unit-dose or other blister or bubble pack as well as for wrapping or containing food preserved by irradiation. Other useful items include medical tubing and valves for any medical device including infusion kits, catheters, and respiratory therapy, as well as packaging materials for medical devices or food which is irradiated including trays, as well as stored liquid, particularly water, milk, or juice, containers including unit servings and bulk storage containers as well as transfer means such as tubing, pipes, and such.

Fabrication of these articles from the polyolefin composition may be accomplished by injection molding, extrusion, thermoforming, blow molding, rotational molding (rotomolding), fiber spinning, spin bonding or melt blown bonding such as for non-woven fabrics, film blowing, stretching for oriented films, casting such as for films (including use of chill rolls), profile deformation, coating (film, wire, and cable), compression molding, calendering, foaming, laminating, transfer molding, cast molding, pultrusion, protrusion, draw reduction, and other common processing methods, or combinations thereof, such as is known in the art and described in, for example, PLASTICS PROCESSING (Radian Corporation, Noyes Data Corp. 1986). Use of at least thermoforming or film applications allows for the possibility of and derivation of benefits from uniaxial or biaxial orientation. Sufficient mixing should take place to assure that an intimately mixed, uniform, blend will be produced prior to conversion into a finished product.

In other embodiments, a method of forming an article containing a polyolefin composition includes extruding or rolling the polyolefin composition to produce a film and cooling the film. The polyolefin composition contains about 40 wt % to about 60 wt % of a HDPE, about 40 wt % to about 60 wt % of a LLDPE, and an additive at a concentration of about 0.001 wt % to about 2 wt %, by weight of the polyolefin composition. The HDPE has a density of greater than 0.93 g/cm$^3$ and the LLDPE has a density of less than 0.915 g/cm$^3$ and a branching index ($g'_{vis}$) of about 0.95 or greater. The polyolefin composition has a density of about 0.915 g/cm$^3$ to about 0.935 g/cm$^3$, a $T_{w1}-T_{w2}$ value of about $-60°$ C. to about $-25°$ C., an Elmendorf Tear value in the machine direction of about 320 g/mil to about 500 g/mil, an Elmendorf Tear value in the transverse direction of about 475 g/mil to about 700 g/mil, and a seal temperature at 1 N of about 70° C. to about 85° C.

Adhesives

The polyolefin compositions or blends thereof can be used as adhesives, either alone or combined with tackifiers. The tackifier is typically present at 1 wt % to 50 wt %, based upon the weight of the blend, 10 wt % to 40 wt %, 20 wt % to 40 wt %. Other additives, as described above, may be added also. These adhesives can be used in any adhesive application including disposables, packaging, laminates, pressure sensitive adhesives, tapes labels, wood binding, paper binding, non-wovens, road marking, reflective coatings, and the like. In one or more embodiments, the adhesives can be used for disposable diaper and napkin chassis construction, elastic attachment in disposable goods converting, packaging, labeling, bookbinding, woodworking, and other assembly applications. Exemplary applications include: baby diaper leg elastic, diaper frontal tape, diaper standing leg cuff, diaper chassis construction, diaper core stabilization, diaper liquid transfer layer, diaper outer cover lamination, diaper elastic cuff lamination, feminine napkin core stabilization, feminine napkin adhesive strip, industrial filtration bonding, industrial filter material lamination, filter mask lamination, surgical gown lamination, surgical drape lamination, and perishable products packaging.

Films

The polyolefin compositions and the blends thereof may be formed into monolayer or multilayer films. These films may be formed by any of the conventional techniques known in the art including extrusion, co-extrusion, extrusion coating, lamination, blowing, and casting. The film may be obtained by the flat film or tubular process which may be followed by orientation in a uniaxial direction or in two mutually perpendicular directions in the plane of the film. One or more of the layers of the film may be oriented in the transverse and/or longitudinal directions to the same or different extents. This orientation may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically, the films are oriented in the Machine Direction (MD) at a ratio of up to 15, between 5 and 7, and in the Transverse Direction (TD) at a ratio of up to 15, 7 to 9. However, in other embodiments, the film is oriented to the same extent in both the MD and TD directions.

In multilayer constructions, the other layer(s) may be any layer typically included in multilayer film structures. For example, the other layer or layers may be:

1. Polyolefins. Exemplary polyolefins include homopolymers or copolymers of $C_2$ to $C_{40}$ olefins, $C_2$ to $C_{20}$ olefins, a copolymer of an alpha-olefin and another olefin or alpha-olefin (ethylene is defined to be an alpha-olefin). Homopolyethylene, homopolypropylene, propylene copolymerized with ethylene and or butene, ethylene copolymerized with one or more of propylene, butene or hexene, and optional dienes. In some examples, thermoplastic polymers can include ultra-low-density polyethylene, very low-density polyethylene, linear low-density polyethylene, low-density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and blends of thermoplastic polymers and elastomers, such as, for example, thermoplastic elastomers and rubber toughened plastics.

2. Polar polymers. Exemplary polar polymers include homopolymers and copolymers of esters, amides, acetates, anhydrides, copolymers of a $C_2$ to $C_{20}$ olefin, such as ethylene and/or propylene and/or butene with one or more polar monomers such as acetates, anhydrides, esters, alcohol, and/or acrylics. Exemplary examples include polyesters, polyamides, ethylene vinyl acetate copolymers, and polyvinyl chloride.

3. Cationic polymers. Exemplary cationic polymers include polymers or copolymers of geminally disubstituted olefins, alpha-heteroatom olefins and/or styrenic monomers. Exemplary geminally disubstituted olefins include isobutylene, isopentene, isoheptene, isohexane, isooctene, isodecene, and isododecene. Exemplary alpha-heteroatom olefins include vinyl ether and vinyl carbazole, exemplary styrenic monomers include styrene, alkyl styrene, para-alkyl styrene, alpha-methyl styrene, chloro-styrene, and bromo-para-methyl styrene. Exemplary examples of cationic polymers include butyl rubber, isobutylene copolymerized with para methyl styrene, polystyrene, and poly-alpha-methyl styrene.

4. Miscellaneous. Other exemplary layers can be paper, wood, cardboard, metal, metal foils (such as aluminum foil and tin foil), metallized surfaces, glass (including silicon oxide ($SiO_x$) coatings applied by evaporating silicon oxide onto a film surface), fabric, spunbonded fibers, and non-wovens (particularly polypropylene spun bonded fibers or non-wovens), and substrates coated with inks, dyes, pigments, and the like.

The films may vary in thickness depending on the intended application; however, films of a thickness from 1 µm to 250 µm are usually suitable. Films intended for packaging are usually from 10 to 60 micron thick. The thickness of the sealing layer is typically 0.2 µm to 50 µm. There may be a sealing layer on both the inner and outer surfaces of the film or the sealing layer may be present on only the inner or the outer surface.

Additives such as blocking agents, antiblocking agents, antioxidants, pigments, fillers, processing aids, UV stabilizers, neutralizers, lubricants, surfactants, and/or nucleating agents may also be present in one or more than one layer in the films. Exemplary additives include silicon dioxide, titanium dioxide, polydimethylsiloxane, talc, dyes, wax, calcium stearate, carbon black, low molecular weight resins and glass beads, these additives are present at from 0.1 ppm to 1,000 ppm.

In other embodiments, one more layers may be modified by corona treatment, electron beam irradiation, gamma irradiation, or microwave irradiation. In one or more embodiments, one or both of the surface layers is modified by corona treatment.

The films described herein may also contain from 5 wt % to 60 wt %, based upon the weight of the polymer and the resin, of a hydrocarbon resin. The resin may be combined with the polymer of the seal layer(s) or may be combined with the polymer in the core layer(s). The resin has a softening point above 100° C., even more from 130° C. to 180° C. Exemplary hydrocarbon resins include those described above. The films containing a hydrocarbon resin may be oriented in uniaxial or biaxial directions to the same or different degrees. For more information on blends of tackifiers and modifiers useful herein, see U.S. Pat. No. 7,595,365.

The films described above may be used as stretch and/or cling films. Stretch/cling films are used in various bundling, packaging, and palletizing operations. To impart cling properties to, or improve the cling properties of, a particular film, a number of well-known tackifying additives have been utilized. Common tackifying additives include polybutenes, terpene resins, alkali metal stearates, and hydrogenated rosins and rosin esters. The cling properties of a film can also be modified by the well-known physical process referred to as corona discharge. Some polymers (such as ethylene methyl acrylate copolymers) do not need cling additives and can be used as cling layers without tackifiers. Stretch/clings films may contain a slip layer containing any suitable polyolefin or combination of polyolefins such as polyethylene, polypropylene, copolymers of ethylene and propylene, and polymers obtained from ethylene and/or propylene copolymerized with minor amounts of other olefins, particularly $C_4$ to $C_{12}$ olefins. Additionally, the slip layer may include one or more anticling (slip and/or antiblock) additives which may be added during the production of the polyolefin or subsequently blended in to improve the slip properties of this layer. Such additives are well-known in the art and include, for example, silicas, silicates, diatomaceous earths, talcs, and various lubricants. These additives are utilized in amounts ranging from 100 ppm to 20,000 ppm, between 500 ppm to 10,000 ppm, by weight based upon the weight of the slip layer. The slip layer may, if desired, also include one or more other additives as described above.

Molded and Extruded Products

The polyolefin compositions described and discussed herein may also be used to prepare molded products in any molding process including injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

The polyolefin compositions described and discussed herein may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof are typically used methods.

Thermoforming is a process of forming at least one pliable plastic sheet into a desired shape. In one or more embodiments, a thermoforming sequence is further described to process the polyolefin compositions. First, an extrudate film of the polyolefin composition (and any other layers or materials) is placed on a shuttle rack to hold it during heating. The shuttle rack indexes into the oven which pre-heats the film before forming. Once the film is heated, the shuttle rack indexes back to the forming tool. The film is then vacuumed onto the forming tool to hold it in place and the forming tool is closed. The forming tool can be either "male" or "female" type tools. The tool stays closed to cool the film and the tool is then opened. The shaped laminate is then removed from the tool. Thermoforming is accomplished by vacuum, positive air pressure, plug-assisted vacuum forming, or combinations and variations of these, once the sheet of material reaches thermoforming temperatures, typically of from 140° C. to 185° C. or higher. A pre-stretched bubble step is used, especially on large parts, to improve material distribution. In one embodiment, an articulating rack lifts the heated laminate towards a male forming tool, assisted by the application of a vacuum from orifices in the male forming tool. Once the laminate is firmly formed the male forming tool, the thermoformed shaped laminate is then cooled, typically by blowers. Plug-assisted forming is generally used for small, deep drawn parts. Plug material, design, and timing can be critical to optimization of the process. Plugs made from insulating foam avoid premature quenching of the plastic. The plug shape is usually similar to the mold cavity, but smaller and without part detail. A round plug bottom will usually promote even material distribution and uniform side-wall thickness. For a semicrystalline polymer, fast plug speeds generally provide the best material distribution in the part. The shaped laminate is then cooled in the mold. Sufficient cooling to maintain a mold temperature of 30° C. to 65° C. is desirable. In some examples, the part is cooled below 90° C. to 100° C. before ejection in one embodiment. The shaped laminate is then trimmed of excess laminate material.

Blow molding is another suitable forming means, which includes injection blow molding, multi-layer blow molding, extrusion blow molding, and stretch blow molding; and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING (Jacqueline I. Kroschwitz, ed., John Wiley & Sons 1990).

In yet another embodiment of the formation and shaping process, profile co-extrusion can be used. The profile co-extrusion process parameters are as above for the blow molding process, except the die temperatures (dual zone top and bottom) range from 150° C. to 235° C., the feed blocks are from 90° C. to 250° C., and the water cooling tank temperatures are from 10° C. to 40° C.

In one or more embodiments of an injection molding process, the shaped laminate is placed into the injection molding tool. The mold is closed and the substrate material is injected into the mold. The substrate material has a melt temperature of about 180° C. to 300° C. or about 200° C. to 250° C., and is injected into the mold at an injection speed of about 2 seconds to about 10 seconds. After injection, the material is packed or held at a predetermined time and pressure to make the part dimensionally and aesthetically correct. Typical time periods are from 5 seconds to 25 seconds and pressures from 1,000 kPa to 15,000 kPa. The mold is cooled between 10° C. and 70° C. to cool the substrate. The temperature will depend on the desired gloss and appearance desired. Typical cooling time is from 10 seconds to 30 seconds, depending on part on the thickness. Finally, the mold is opened and the shaped composite article ejected.

Likewise, molded articles may be fabricated by injecting molten polyolefin polymer blend into a mold that shapes and solidifies the molten polymer into desirable geometry and thickness of molded articles. A sheet may be made either by extruding a substantially flat profile from a die, onto a chill roll, or alternatively by calendering. Sheet will generally be considered to have a thickness of from 10 mils to 100 mils (254 µm to 2,540 µm), although sheet may be substantially thicker. Tubing or pipe may be obtained by profile extrusion for uses in medical, potable water, land drainage applications, or the like. The profile extrusion process involves the extrusion of molten polymer through a die. The extruded tubing or pipe is then solidified by chill water or cooling air into a continuous extruded articles. The tubing will generally be in the range of from 0.31 cm to 2.54 cm in outside diameter and have a wall thickness of in the range of from 254 µm to 0.5 cm. The pipe will generally be in the range of from 2.54 cm to 254 cm in outside diameter and have a wall thickness of in the range of from 0.5 cm to 15 cm. In one or more examples, one or more sheets made from the polyolefin compositions may be used to form containers. Such containers may be formed by thermoforming, solid phase pressure forming, stamping, and other shaping techniques. Sheets may also be formed to cover floors or walls or other surfaces.

In an embodiment of the thermoforming process, the oven temperature is between 160° C. and 195° C., the time in the oven between 10 and 20 seconds, and the die temperature, typically a male die, between 10° C. and 71° C. The final thickness of the cooled (room temperature), shaped laminate is from 10 µm to 6000 µm in one embodiment, from 200 µm to 6000 µm. In other embodiments, from 250 µm to 3000 µm in other embodiments, and from 500 µm to 1550 µm in other embodiments, a desirable range being any combination of any upper thickness limit with any lower thickness limit.

In an embodiment of the injection molding process, wherein a substrate material is injection molded into a tool including the shaped laminate, the melt temperature of the substrate material is between 190° C. and 255° C. in one embodiment, and between 210° C. and 250° C. in another embodiment; the fill time from 2 to 10 seconds in one embodiment, from 2 to 8 seconds in another embodiment; and a tool temperature of from 25° C. to 65° C. in one embodiment, from 27° C. and 60° C. in another embodiment. In some examples, the substrate material is at a temperature that is hot enough to melt any tie-layer material or backing layer to achieve adhesion between the layers.

In other embodiments, the polyolefin compositions may be secured to a substrate material using a blow molding operation. Blow molding is particularly useful in such applications as for making closed articles such as fuel tanks and other fluid containers, playground equipment, outdoor furniture and small enclosed structures.

This invention also a relates to:

1. A polyolefin composition, comprising:

a) about 40 wt % to about 60 wt %, by weight of the polyolefin composition, of a high-density polyethylene (HDPE) having a density of greater than 0.93 g/cm$^3$ and a melt index of about 0.2 dg/min to about 10 dg/min; and b) about 40 wt % to about 60 wt %, by weight of the polyolefin composition, of a linear low-density polyethylene (LLDPE) having a density of less than 0.915 g/cm$^3$ and a melt index of about 0.2 dg/min to about 10 dg/min;

said polyolefin composition having a density of about 0.91 g/cm$^3$ or greater; a melt index of about 0.5 dg/min to about 6 dg/min; and a $T_{w1}-T_{w2}$ value of about −25° C. or less.

2. The polyolefin composition of paragraph 1, wherein the polyolefin composition has a $T_{w1}-T_{w2}$ value of about $-60°$ C. to about $-30°$ C.

3. The polyolefin composition of paragraph 1 or 2, wherein the polyolefin composition has a $T_{w1}-T_{w2}$ value of about $-50°$ C. to about $-35°$ C.

4. The polyolefin composition according to any one of paragraph 1-3, wherein the polyolefin composition further comprises a $M_{w1}/M_{w2}$ value of about 0.85 to about 1.10.

5. The polyolefin composition according to any one of paragraphs 1-4, wherein the polyolefin composition further comprises a $M_{w1}/M_{w2}$ value of about 0.88 to about 1.08.

6. The polyolefin composition according to any one of paragraphs 1-5, wherein the polyolefin composition comprises about 45 wt % to about 55 wt % of the HDPE and about 45 wt % to about 55 wt % of the LLDPE.

7. The polyolefin composition according to any one of paragraphs 1-6, wherein the polyolefin composition comprises about 50 wt % of the HDPE and about 50 wt % of the LLDPE.

8. The polyolefin composition according to any one of paragraphs 1-7, wherein the polyolefin composition has a density of about 0.915 g/cm³ to about 0.935 g/cm³.

9. A film comprising the polyolefin composition according to any one of paragraphs 1-8.

10. The film of paragraph 9, wherein the film is a blown film, a cast film, a compression-molded film, a machine-direction oriented film, a biaxial oriented film, or any combination thereof.

11. The film of paragraph 9 or 10, wherein the film comprises an additive at a concentration of about 0.001 wt % to about 2 wt %, based on the weight of the polyolefin composition.

12. The film according to any one of paragraphs 9-11, wherein the film has a 1% Secant average value of about 30,000 psi to about 44,000 psi.

13. The film according to any one of paragraphs 9-12, wherein the film has a 1% Secant average value of about 32,000 psi to about 42,000 psi.

14. The film according to any one of paragraphs 9-13, wherein the film has an Elmendorf Tear value in the machine direction of about 320 g/mil to about 500 g/mil.

15. The film according to any one of paragraphs 9-14, wherein the film has an Elmendorf Tear value in the machine direction of about 350 g/mil to about 450 g/mil.

16. The film according to any one of paragraphs 9-15, wherein the film has an Elmendorf Tear value in the transverse direction of about 475 g/mil to about 700 g/mil.

17. The film according to any one of paragraphs 9-16, wherein the film has an Elmendorf Tear value in the transverse direction of about 500 g/mil to about 650 g/mil.

18. The film according to any one of paragraphs 9-17, wherein the film has a seal temperature at 1 N of about 70° C. to about 85° C.

19. The film according to any one of paragraphs 9-18, wherein the film has a seal temperature at 5 N of about 80° C. to about 95° C.

20. The film according to any one of paragraphs 9-19, wherein the film has a peel-break transition temperature of about 100° C. to about 120° C.

21. The film according to any one of paragraphs 9-20, wherein the film has a hot tack temperature at 1 N of about 70° C. to about 95° C.

22. The film according to any one of paragraphs 9-21, wherein the film has a hot tack temperature at 5 N of about 80° C. to about 105° C.

23. The film according to any one of paragraphs 9-22, wherein the film has a hot tack window temperature at 5 N of about 40° C. to about 75° C.

24. The film according to any one of paragraphs 9-23, wherein the film has a maximum hot tack force of about 5 N to about 20 N.

25. The polyolefin composition according to any one of paragraphs 1-24, wherein the HDPE has an Mw/Mn of about 1 to about 8.

26. The polyolefin composition according to any one of paragraphs 1-25, wherein the LLDPE has an Mw/Mn of about 1 to about 8.

27. A film comprising: a polyolefin composition comprising:
 a) about 40 wt % to about 60 wt %, by weight of the polyolefin composition, of a high-density polyethylene (HDPE) having a density of greater than 0.93 g/cm³;
 b) about 40 wt % to about 60 wt %, by weight of the polyolefin composition, of a linear low-density polyethylene (LLDPE) having a density of less than 0.915 g/cm³;
 wherein the polyolefin composition having a density of about 0.915 g/cm³ to about 0.935 g/cm³; a melt index of about 0.5 dg/min to about 6 dg/min; and a $T_{w1}-T_{w2}$ value of about $-60°$ C. to about $-25°$ C.,
 wherein the film has:
  i) a 1% Secant average value of about 30,000 psi to about 44,000 psi;
  ii) an Elmendorf Tear value in the machine direction of about 320 g/mil to about 500 g/mil;
  iii) an Elmendorf Tear value in the transverse direction of about 475 g/mil to about 700 g/mil, and
  iv) a seal temperature at 1 N of about 70° C. to about 85° C. or at 5 N of about 80° C. to about 95° C.

28. A polyolefin film comprising a polyolefin composition comprising:
 a) about 40 wt % to about 60 wt %, by weight of the polyolefin composition, of a high-density polyethylene (HDPE) comprising a density of greater than 0.93 g/cm³;
 b) about 40 wt % to about 60 wt %, by weight of the polyolefin composition, of a linear low-density polyethylene (LLDPE) comprising a density of less than 0.915 g/cm³;
 c) an additive at a concentration of about 0.001 wt % to about 2 wt %;
 wherein the polyolefin composition has a density of about 0.915 g/cm³ to about 0.935 g/cm³; and a $T_{w1}-T_{w2}$ value of about $-60°$ C. to about $-25°$ C.; and
 wherein the film has
  i) an Elmendorf Tear value in the machine direction of about 320 g/mil to about 500 g/mil;
  ii) an Elmendorf Tear value in the transverse direction of about 475 g/mil to about 700 g/mil; and
  iii) a seal temperature at 1 N of about 70° C. to about 85° C. or at 5 N of about 80° C. to about 95° C.

29. A method of forming an article comprising a polyolefin composition, comprising:
 extruding or rolling the polyolefin composition to produce a film; and
 cooling the film;
 wherein the polyolefin composition comprises:
 a) about 40 wt % to about 60 wt %, by weight of the polyolefin composition, of a high-density polyethylene (HDPE) comprising a density of greater than 0.93 g/cm³;
 b) about 40 wt % to about 60 wt %, by weight of the polyolefin composition, of a linear low-density polyethylene (LLDPE) comprising a density of less than 0.915 g/cm³; and c) an additive at a concentration of about 0.001 wt % to about 2 wt %;

wherein the polyolefin composition has a density of about 0.915 g/cm$^3$ to about 0.935 g/cm$^3$; and a $T_{w1}-T_{w2}$ value of about −60° C. to about −25° C.; and wherein the film has i) an Elmendorf Tear value in the machine direction of about 320 g/mil to about 500 g/mil;

ii) an Elmendorf Tear value in the transverse direction of about 475 g/mil to about 700 g/mil; and iii) a seal temperature at 1 N of about 70° C. to about 85° C. or at 5 N of about 80° C. to about 95° C.

30. The method of paragraph 29, wherein cooling the film comprises blowing air on at least a portion of the film.

It will be understood by those skilled in the art that the steps outlined above may be varied, depending upon the desired result. For example, the extruded sheet of the polyolefin compositions may be directly thermoformed or blow molded without cooling, thus skipping a cooling step. Other parameters may be varied as well in order to achieve a finished composite article having desirable features.

Test Methods

Melt Index (MI, also referred to as I2) is measured according to ASTM D1238 at 190° C., under a load of 2.16 kg unless otherwise noted. The units for MI are g/10 min or dg/min.

High Load Melt Index (HLMI, also referred to as $I_{21}$) is the melt flow rate measured according to ASTM D-1238 at 190° C., under a load of 21.6 kg. The units for HLMI are g/10 min or dg/min.

Melt Index Ratio (MIR) is the ratio of the high load melt index to the melt index, or $I_{21}/I_2$.

Density is measured by density-gradient column, as described in ASTM D1505, on a compression-molded specimen that has been cooled to room temperature following ASTM D4703-10a, Procedure C, then conditioned under ASTM D618-08 (23°±2° C. and 50±10% Relative Humidity) for 40 Hours before testing.

Differential Scanning Calorimetry (DSC)

Crystallization temperature (Tc) and melting temperature (Tm) are measured using Differential Scanning Calorimetry (DSC) using a TA Instruments DSC Discovery 2500. Typically, 6 to 10 mg of molded polymer or plasticized polymer is sealed in an aluminum pan and loaded into the instrument at room temperature. Melting data (first heat) is acquired by heating the sample to at least 30° C. above its melting temperature, typically 180° C. for polyethylene, at a heating rate of 10° C./min. The sample is held for at least 1 minutes at this temperature to erase its thermal history. Crystallization data are acquired by cooling the sample from the melt to at least 50° C. below the crystallization temperature, typically −90° C. for polyethylene, at a cooling rate of 10° C./min. The sample is held at this temperature for at least 1 minute, and finally heated at 10° C./min to acquire additional melting data (second heat). The endothermic melting transition (first and second heat) and exothermic crystallization transition are analyzed for onset of transition and peak temperature. The melting temperatures reported are the peak melting temperatures from the second heat unless otherwise specified. For polymers displaying multiple peaks, the melting point (or melting temperature) is defined to be the peak melting temperature (i.e., associated with the largest endothermic calorimetric response in that range of temperatures) from the DSC melting trace; likewise, the crystallization temperature is defined to be the peak crystallization temperature (i.e., associated with the largest exothermic calorimetric response in that range of temperatures) from the DSC crystallization trace.

Areas under the DSC curve are used to determine the heat of transition (heat of fusion, Hf, upon melting or heat of crystallization, Hc, upon crystallization, if the Hf value from the melting is different from the Hf value obtained for the heat of crystallization, then the value from the melting (Tm) shall be used), which can be used to calculate the degree of crystallinity (also called the percent crystallinity). The percent crystallinity (X %) is calculated using the formula: [area under the curve (in J/g)/H° (in J/g)]*100, where H° is the heat of fusion for the homopolymer of the major monomer component. These values for H° are to be obtained from the Polymer Handbook, Fourth Edition, published by John Wiley and Sons, New York 1999, except that a value of 290 J/g is used as the equilibrium heat of fusion (H°) for 100% crystalline polyethylene.

Gel Permeation Chromatography

Unless otherwise indicated, the distributions and the moments of molecular weight (Mw, Mn, Mw/Mn, etc.), the comonomer content ($C_2$, $C_3$, $C_6$, etc.) and the branching index ($g'_{vis}$) are determined by using a high temperature Gel Permeation Chromatography (Polymer Char GPC-IR) equipped with a multiple-channel band-filter based Infrared detector IR5, an 18-angle Wyatt Dwan Heleos light scattering detector and a 4-capillary viscometer with Wheatstone bridge configuration. Three Agilent PLgel 10-µm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-µm Teflon filter and degassed with an online degasser before entering the GPC instrument. The nominal flow rate is 1.0 ml/min and the nominal injection volume is 200 µL. The whole system including transfer lines, columns, and viscometer detector are contained in ovens maintained at 145° C. The polymer sample is weighed and sealed in a standard vial with 80-µL flow marker (Heptane) added to it. After loading the vial in the autosampler, polymer is automatically dissolved in the instrument with 8 ml added TCB solvent. The polymer is dissolved at 160° C. with continuous shaking for about 2 hour for the polypropylene samples. The concentration (c), at each point in the chromatogram is calculated from the baseline-subtracted IR5 broadband signal intensity (I), using the following equation: c=βI, where β is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{a+1} + \frac{a_{PS}+1}{a+1}\log M_{PS}$$

where the variables with subscript "PS" stand for polystyrene while those without a subscript are for the test samples. In this method, $\alpha_{PS}$=0.67 and $K_{PS}$=0.000175 while $\alpha$ and K are for other materials as calculated and published in literature (Sun, T. et al. Macromolecules 2001, 34, 6812), except that, $\alpha$=0.695 and K=0.000579 for linear ethylene polymers, $\alpha$=0.705 and K=0.0002288 for linear propylene polymers. Concentrations are expressed in g/cm3, molecular weight is expressed in g/mole, and intrinsic viscosity (hence K in the Mark-Houwink equation) is expressed in dL/g unless otherwise noted. Here the concentrations are expressed in g/cm$^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyl number per 1,000 total carbons ($CH_3$/1000TC) as a function of molecular weight. The short-chain branch (SCB) content per 1,000TC (SCB/1000TC) is then computed as a function of molecular weight by applying a chain-end correction to the $CH_3$/1000TC function, assuming each chain to be linear and terminated by a methyl group at each end.

The LS molecular weight (M) at each point in the chromatogram is determined by analyzing the LS output using the Zimm model for static light scattering $$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and $\lambda$=665 nm. For analyzing PE polymers, dn/dc=0.1048 ml/mg and $A_2$=0.0015.

A high temperature Polymer Char viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, m, for the solution flowing through the viscometer is calculated from their outputs. The intrinsic viscosity, [η], at each point in the chromatogram is calculated from the equation [η]=$\eta_s$/c, where c is concentration and is determined from the IR5 broadband channel output.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as $$g'_{vis} = \frac{[\eta]_{avg}}{KM_v^\alpha},$$

where $M_v$ is the viscosity-average molecular weight based on molecular weights determined by LS analysis and the K and $\alpha$ are for the reference linear polymer, which are calculated and published in literature (Sun, T. et al. Macromolecules 2001, 34, 6812), except that, $\alpha$=0.695 and K=0.000579 for linear ethylene polymers, $\alpha$=0.705 and K=0.0002288 for linear propylene polymers.

Experimental and analysis details not described above, including how the detectors are calibrated and how to calculate the composition dependence of Mark-Houwink parameters and the second-virial coefficient, are described by T. Sun, P. Brant, R. R. Chance, and W. W. Graessley (*Macromolecules*, 2001, Vol. 34(19), pp. 6812-6820).

Tw1, Tw2, Mw1 and Mw2 are determined using data obtained from Cross fractionation chromatography (CFC) also known as TREF-GPC. It consists of two columns in series: TREF followed by GPC, and provides both comonomer distribution (CD) and molecular weight distribution (MWD) of a polymer sample being analyzed. The sample is first crystallized in a TREF column at a chosen temperature, then an elution follow of solvent is started without changing the temperature, sending the soluble fraction to the GPC column for fractionation and analysis, followed by a stepwise increase in the elution temperature, sending polymer fractions dissolved at each temperature to the GPC for analysis. The CFC instrument used to perform the analysis was by Polymer Char (Valencia, Spain), with orthodichlorobenzene as the solvent and IR detector for concentration and composition detection. Each CFC analysis generates a set of polymer fractions (including the soluble fraction) with the fraction temperature ($T_i$) and the normalized weight fraction or percentage ($W_i$ or wt %) and various moments of molecular weight averages, including weight average molecular weight ($M_{wi}$) of each fraction. From these basic CFC results, the following characteristic values, $T_{w1}$, $T_{w2}$, $M_{w1}$, and $M_{w2}$ can be calculated, as described at column 29, line 1 to column 32, line 17 and FIGS. 3A, 3B and 4 of U.S. Pat. No. 10,253,121, which is herein incorporated by reference.

Film Analysis

For all film analysis, film specimens are conditioned at 23° C.+/−2° C. and 50+/−10% relative humidity in accordance with Procedure A of ASTM D618 (40 hour minimum) unless otherwise specified. Where applicable, the properties and descriptions below are intended to encompass measurements in both the machine and transverse directions. Such measurements are reported separately, with the designation "MD" indicating a measurement in the machine direction, and "TD" indicating a measurement in the transverse direction.

Gauge, reported in mils, was measured using a HEIDENHAN Gauge Micrometer following ASTM D6988-13, apparatus C, method C. For average gauge of a film roll, twenty (20) readings were taken, with the location for each reading evenly distributed on the sample. For each film sample, ten film thickness data points were measured per inch of film as the film was passed through the gauge in a transverse direction. From these measurements, an average gauge measurement was determined and reported.

Elmendorf Tear, reported in grams (g) or grams per mil (g/mil), was determined according to ASTM D-1922.

Tensile Strength at Yield, Tensile Strength at Break or Ultimate Tensile Strength are measured as specified by ASTM D-882.

Elongation at Yield and Elongation at Break, reported as a percentage (%), are measured as specified by ASTM D-882.

1% Secant Modulus (M), reported in pounds per square inch ($lb/in^2$ or psi), was measured as specified by ASTM D-882 using 1 inch wide film strip.

Haze, reported as a percentage (%), was measured as specified by ASTM D-1003. Internal Haze, reported as a percentage (%), is the haze excluding any film surface contribution. The film surfaces are coated with ASTM approved inert liquids to eliminate any haze contribution from the film surface topology. The internal haze measurement procedure is per ASTM D 1003.

Clarity is measured using a haze-gard I haze meter (BYK-Gardner GmbH, Geretsried, Germany). It quantifies a film sample's narrow-angle scattering characteristics and is defined as the percentage of transmitted light passing through a film specimen that is deflected at angles of less than 2.5 degree. Three specimen of 3" by 3" size were taken from different sections of the blown film, and the average values were reported. The film samples were conditioned at 23±2° C. and 50±10% relative humidity for at least 40 hours prior to testing.

Dart Drop Impact or Dart Drop Impact Strength (DIS), reported in grams (g) and/or grams per mil (g/mil), was measured as specified by ASTM D-1709, method A, unless otherwise specified.

Seal Properties (Temperature) Procedure

Two layers of films of the polyolefin composition, 1 mil gauge, were sealed on HSX-1 Heat Sealer in the TD direction at various temperatures under 73 psi (0.5 MPa or $N/mm^2$) for 1 second. Once sealed film samples have cooled to room temp, test strips of 1 inch wide were cut then conditioned at 230±2° C. and 50±10% Relative Humidity for approximately 24 hours prior to testing on a United 6 Station. The testing is done in T-peel mode at 20 inch/min tensile speed. Three to five test specimens were tested for each sealed specimen and the average seal force was recorded and used to generate a seal force vs. temperature curve. From the curve, the temperatures to reach 1N and 5N seal forces were determined as seal temperatures (also referred to as seal initiation temperatures), and the maximum seal force is also recorded as seal strength.

Peel-Break Transition Temperature Procedure

The peel-break transition temperature values of the polyolefin compositions were determined by the following procedure. In sealed sample testing, the failure modes of the specimens of the polyolefin compositions can be either peal or break, and generally, peal mode occurs when the sealing temperatures are low, and break mode occurs when the seal temperature reaches a sufficiently high level. Because sealed specimens were prepared at discrete temperatures, normally at 5° C. step, several scenarios could happen. When all specimens fail in peal mode at one temperature but in break mode at the next higher temperature, peel-break transition temperature is defined as the average of the two temperatures. When the failure mode is mixed at a sealing temperature, and all specimens fail in peal mode at the temperature below it but in break mode at the temperature above it, the mixed failure mode temperature is taken as the peel-break temperature. When mixed mode failure occurs at two or more adjacent temperatures, the average of them is taken as the peel-break temperature.

Hot-Tack Test Procedures

After conditioning the film samples of the polyolefin compositions for 40 hours (minimum) at 23° C.±2° C. and 50±10% relative humidity, 2.5 mil 3M/854 polyester film tape is applied to the back (or outside) of the film specimen as a backing, to test the "Inside to Inside" tack. The film sample with tape backing is cut into 1 inch wide and at least 16 inches long specimens, then sealed on J&B Hot Tack Testers 4000 under the standard conditions of 73 psi (0.5 MPa) Seal Pressure for 0.5 seconds, followed by a 0.4 second delay, then the sealed specimens were pulled at 200 mm/speed in T-joint peel mode. Four test specimens are measured at each temperature point and the average hot tack strength is recorded for each temperature point to generate a hot tack strength curve. From that curve, the temperatures to reach 1 N and 5 N tack forces are determined, as well as the maximum hot tack force. Hot tack window is defined as the temperature range where the hot tack is at or above 5 N, from the temperature at which the hot-tack first reaches 5 N to the temperature it eventually drops down to 5 N again.

EXAMPLES

All reactions in the following examples were performed using as-received starting materials without any purification. Comparative Examples 1, 2 and blend component LLDPE were prepared using Catalyst 1 ((cyclopentadienyl) (propyltetramethylcyclopentadienyl) hafnium dichloride) combined with methylalumoxane in a gas phase polymerization process. Comparative Example 3 and blend components HDPE 1, 2 and 3 were prepared with catalyst 2 (bis(propylcyclopentadienyl)hafnium dimethyl) combined with methylalumoxane in a gas phase polymerization process. Comparative Example 4 is an ethylene-hexene metallocene copolymer having a density of 0.918 g/cc, commercially available as EXCEED™ 1018 from EXXONMOBIL Chemical Company. ES70-875 silica is ES70™ silica (PQ Corporation, Conshohocken, Pa.) that has been calcined at approx. 875° C. (for approx. 4 hours) and stored under nitrogen.

SMAO-ES70-875: Methylalumoxane treated silica was prepared in a manner similar to the following: In a 4 L stirred vessel in a drybox methylalumoxane (MAO, 30 wt % in toluene, approx. 1,000 grams) is added along with approximately 2,000 g of toluene. This solution is then stirred at 60 RPM for 5 minutes. Next, approximately 800 grams of ES-70-875 silica is added to the vessel. This slurry is then heated at 100° C. and stirred at 120 RPM for 3 hours. The temperature is then reduced to 25° C. and cooled to temperature over 2 hours. Once cooled, the vessel is set to 8 RPM and placed under vacuum for 72 hours. After emptying the vessel and sieving the supported MAO, approximately 1100 g of supported MAO will be collected.

The catalysts were loaded onto the SMAO-ES70-875 support in toluene solvent and dried to free flowing powder form.

The gas polymerization process was performed in an 18.5 foot tall gas-phase fluidized bed reactor with an 18" diameter straight section. Cycle and feed gases were fed into the reactor body through a perforated distributor plate, and the reactor was controlled at about 290 psi and about 70 mol % ethylene. Reactor temperature was maintained by heating the cycle gas. Reaction conditions of comparative example 1 through 3, the LLDPE, HPDE 1 and HDPE2 may be found in the following table. HDPE3 polymer was made under similar conditions as HDPE2, except that no hexene comonomer was used.

TABLE 1

Production of Polyethylene (Polymerization Conditions)

| Description | Comp-Ex-1 | Comp-Ex-2 | Comp-Ex-3 | LLDPE | HDPE1 | HDPE2 |
| --- | --- | --- | --- | --- | --- | --- |
| Bed temp(° F.) | 170.0 | 184.9 | 190.0 | 161 | 190.0 | 190 |
| Reactor pressure (psig) | 289.6 | 290.0 | 289.9 | 289.9 | 289.9 | 290.0 |
| Ethylene concentration (mol %) | 62.44 | 65.60 | 65.57 | 62.38 | 75.04 | 65.64 |
| Ethylene partial pressure (psia) | 190.0 | 199.9 | 199.7 | 190.0 | 228.6 | 200.0 |
| $H_2$ concentration (ppm) | 250 | 197 | 153 | 294 | 186 | 160.5 |
| $C_6/C_2$ = gas ratio (molar) | 0.02867 | 0.01641 | 0.00378 | 0.03284 | 0.00030 | 0.0014 |
| Production rate (lb/hr) | 153 | 131 | 140 | 103 | 127 | 142 |
| Residence time (hr) | 4.71 | 5.51 | 4.68 | 6.25 | 4.85 | 4.34 |
| Bed Weight (lb) | 719.1 | 722 | 656.1 | 645 | 615 | 617.2 |
| Catalyst/activator (lb/lb) | 7799 | 4534 | 7973 | 7526 | 7950 | 5597 |
| Cycle Gas Velocity (ft/s) | 2.1 | 2.1 | 2.1 | 2.1 | 2.1 | 2.1 |

Reactor resins of Comparative Examples 1-3, the LLDPE, the HDPE1, the HDPE2 and the HDPE3 were compounded with stabilizers into pellet resins through simple melt blending on lab scale twin screw extruders (Leistritz 27, Leistritz 18 or Coperion W&P 57) under typical PE compounding conditions. Prior to melt mixing, the polyethylene components, usually in granular forms, were dry blended in a tumble mixer with the following additive: 500 ppm of Irganox™-1076, 1,000 ppm of Irgafos™ 168, and 600 ppm of Dynamar™ FX5920A.

Table 2 provides various properties for each of the LLDPE, the HDPE1, the HDPE2, and the HDPE3 used in the blending to produce the respective Examples 1-3.

TABLE 2

|  | LLDPE | HDPE1 | HDPE2 | HDPE3 | Comp Ex. 4 |
| --- | --- | --- | --- | --- | --- |
| Density (g/cm3) | 0.8948 | 0.9518 | 0.9436 | 0.9577 | 0.9187 |
| $I_2$ (g/10 min) | 1.0 | 0.86 | 1.03 | 1.05 | 0.99 |
| $I_{21}$ (g/10 min) | 16.2 | 14.5 | 17.0 | 18.7 | 15.1 |
| MIR | 16.4 | 17.2 | 16.5 | 17.8 | 15.2 |
| Mn (g/mol) | 46,263 | 40,424 | 43,303 | 36,105 | 42,694 |
| Mw (g/mol) | 119,352 | 124,722 | 117,406 | 118,073 | 115,629 |
| Mw/Mn | 2.58 | 3.09 | 2.71 | 3.27 | 2.71 |

The inventive examples were physical blends of LLDPE and the three HDPE resins introduced above. Table 2 lists the amounts of LLDPE and the amounts and types of HDPE in each of the Examples 1-3. As such, the polyolefin composition of Example 1 contains LLDPE and HDPE1, the polyolefin composition of Example 2 contains LLDPE and HDPE2, and the polyolefin composition of Example 3 contains LLDPE and HDPE3, per the listed amounts in Table 3.

TABLE 3

| Exs. | LLDPE (wt %) | HDPE1 (wt %) | HDPE2 (wt %) | HDPE3 (wt %) |
|---|---|---|---|---|
| 1 | 50 | 50 | 0 | 0 |
| 2 | 46 | 0 | 54 | 0 |
| 3 | 57.5 | 0 | 0 | 42.5 |

Comparative examples 1-4 and examples 1-3 were then blown into films on a blown film extruder (Cyber Plastic Machinery) line. For the three inventive examples, the raw materials were dry blended together, then fed directly into the blown film extruder to produce the blown film samples. Mono-layer films of approximately 1.1 mil were made. The film line has a 2" general purpose screw with an L/D ratio of 30. There were a total of nine heating zones: four on the extruder, two on the die and one each for the screen changer, adapter and the block zone before the die. Typical temperature (° F.) settings are given below.

| Barrel 1 | Barrel 2 | Barrel 3 | Barrel 4 | Screen Changer | Adapter | Block Zone | Die Zone 1 | Die Zone 2 |
|---|---|---|---|---|---|---|---|---|
| 300 | 350 | 355 | 340 | 350 | 355 | 360 | 370 | 370 |

For all the comparative and inventive examples, the die gap utilized was 60 mil and the blow-up ratio was 2.5. For comparative example 4, at the extruder speed of 30 RPM, the extruder throughput was about 50 lb/hr, equivalent to specific throughput of approximately 8 lb/hr-in die. Combined with a take-off speed of about 100 fpm and a lay-flat of 7.8 in, a nominal 1 mil film was obtained, and the frost-line-height was about 11 inches. All other materials were processed at the extruder speed of 30 RPM as well, and behaved similarly to comparative example 4, their frost-line-heights varied somewhat, but within 8 to 12 inches.

Table 4 lists various resin and composition properties measured for Comparative Examples 1-4 (All data were on formulated resins—with stabilizer-type additives introduced as described above) and the inventive blend Examples 1-3 containing the polyolefin composition of Table 2. Since inventive examples were physical blends of PE pallets that were turned into blown films directly, blown films were used directly in analysis requiring small samples, while $I_2$, $I_{21}$ and density were from compression molded films. All comparative and inventive examples are at nominal 1 g/10 min MI, 15 to 17 MIR ($I_{21}/I_2$) and similar molecular weight and molecular weight distributions.

TABLE 4

|  | Comp. Ex. 1 | Comp. Ex. 2 | Comp. Ex. 3 | Comp. Ex. 4 | Ex. 1 | Ex. 2 | Ex. 3 |
|---|---|---|---|---|---|---|---|
| $I_2$ (g/10 min) | 0.96 | 1.08 | 1.06 | 0.99 | 0.89 | 1.01 | 1.03 |
| $I_{21}$ (g/10 min) | 15.7 | 16.9 | 17.7 | 15.1 | 15.5 | 17.0 | 17.8 |
| MIR | 16.4 | 15.6 | 16.7 | 15.2 | 17.4 | 16.7 | 17.2 |
| Compound density (g/cm$^3$) | 0.907 | 0.92 | 0.9363 | 0.9187 | 0.9198 | 0.9209 | 0.9202 |
| Tm, ° C. (DSC) | 95.1 | 116.9 | 127.2 | 119 | 130.3 | 127.6 | 131.7 |
| Heat of fusion, J/g (DSC) | 78.3 | 123.0 | 154.5 | 115.5 | 115.7 | 115.9 | 112.8 |
| Crystallinity, % (DSC) | 27.0 | 42.4 | 53.3 | 39.8 | 39.9 | 40.0 | 38.9 |
| $M_n$ (g/mol) | 44,876 | 39,572 | 41,485 | 42,694 | 43,741 | 46,232 | 43,207 |
| $M_w$ (g/mol) | 115,864 | 113,015 | 115,349 | 115,629 | 117,413 | 117,206 | 117,359 |
| $M_w/M_n$ | 2.58 | 2.86 | 2.78 | 2.71 | 2.68 | 2.54 | 2.72 |
| g'(Vis) | 1.01 | 0.99 | 1.00 | 1.02 | 0.99 | 1.02 | 1.02 |

TABLE 4-continued

|  | Comp. Ex. 1 | Comp. Ex. 2 | Comp. Ex. 3 | Comp. Ex. 4 | Ex. 1 | Ex. 2 | Ex. 3 |
|---|---|---|---|---|---|---|---|
| $M_{w1}$ (CFC) | 83,006 | 87,171 | 87,585 | 98,958 | 94,505 | 88,259 | 92,225 |
| $M_{w2}$ (CFC) | 91,533 | 95,911 | 88,863 | 91,060 | 97,043 | 98,870 | 87,091 |
| $T_{w1}$ (° C.) (CFC) | 59.6 | 79.1 | 92.2 | 76.7 | 51.8 | 53.4 | 51.2 |
| $T_{w2}$ (° C.) (CFC) | 71.3 | 87.3 | 95.0 | 86.2 | 97.6 | 95.5 | 97.7 |
| $M_{w1}/M_{w2}$ (CFC) | 0.907 | 0.909 | 0.986 | 1.087 | 0.974 | 0.893 | 1.059 |
| $T_{w1} - T_{w2}$ (° C.) (CFC) | −11.7 | −8.2 | −2.8 | −9.5 | −45.9 | −42.1 | −46.5 |
| $T_w$ (° C.) (CFC) | 64.9 | 82.4 | 92.8 | 81.1 | 74.5 | 76.5 | 73.3 |

Table 5 lists additional measured properties including strength tests for the blown films of Comparative Examples 1-4 and the inventive Examples 1-3.

TABLE 5

|  | Comp. Ex. 1 | Comp. Ex. 2 | Comp. Ex. 3 | Comp. Ex. 4 | Ex. 1 | Ex. 2 | Ex. 3 |
|---|---|---|---|---|---|---|---|
| Gauge (mil) | 1.04 | 1.15 | 1.16 | 1.16 | 1.12 | 1.18 | 1.19 |
| 1% Secant (psi) | | | | | | | |
| MD | 11565 | 27657 | 63538 | 25722 | 37456 | 33297 | 33174 |
| TD | 12415 | 30078 | 75165 | 29564 | 43401 | 36482 | 34473 |
| AVG | 11990 | 28868 | 69352 | 27643 | 40429 | 34889 | 33823 |
| Tensile Yield Strength (psi) | | | | | | | |
| MD | 760 | 1362 | 2406 | 1295 | 1585 | 1474 | 1374 |
| TD | 718 | 1406 | 2876 | 1320 | 1776 | 1645 | 1535 |
| Tensile Strength (psi) | | | | | | | |
| MD | 9470 | 8953 | 9281 | 9012 | 8484 | 9463 | 9240 |
| TD | 10714 | 8382 | 7729 | 7523 | 8378 | 7394 | 7186 |
| Elongation @ Break (%) | | | | | | | |
| MD | 409 | 537 | 653 | 497 | 609 | 558 | 535 |
| TD | 587 | 699 | 800 | 649 | 708 | 733 | 661 |
| Tensile Break Energy-MD (in-lbs/in$^3$) | 11697 |  | 26995 | 18421 | 20848 | 20017 | 17653 |
| Tensile Break Energy-TD (in-lbs/in$^3$) | 17496 |  | 29096 | 19384 | 23412 | 21605 | 18222 |

Table 6 lists additional measured properties including strength and seal tests for the Comparative Examples 1-4 and the inventive Examples 1-3 containing.

TABLE 6

|  | Comp Ex. 1 | Comp Ex. 2 | Comp Ex. 3 | Comp Ex. 4 | Ex. 1 | Ex. 2 | Ex. 3 |
|---|---|---|---|---|---|---|---|
| Elmendorf Tear/ | | | | | | | |
| Elmendorf Tear MD (g) | 122 | 325.6 | 47.4 | 302.7 | 461.8 | 483.5 | 434.9 |
| Elmendorf Tear TD (g) | 276.3 | 509.3 | 345.6 | 485.5 | 592 | 736 | 624.3 |
| MD (g/mil) | 117 | 304 | 42 | 254 | 420 | 410 | 365 |
| TD (g/mil) | 256 | 463 | 293 | 416 | 529 | 624 | 534 |
| MD/TD | 0.46 | .66 | .14 | .61 | .79 | .66 | .68 |
| Dart Drop, Phenolic (g) | 1382 | 387 | 98 | 685 | 323 | 393 | 699 |
| Dart Drop, Phenolic (g/mil) | 1310 | 337 | 84 | 591 | 288 | 333 | 587 |
| Puncture (Btec probe, B) | | | | | | | |
| Peak Force (lbs) | 15.11 | 15.12 | 13.23 | 14.77 | 10.83 | 13.81 | 11.32 |
| Peak Force (lbs/mil) | 14.52 | 13.15 | 11.4 | 12.70 | 9.67 | 11.7 | 9.51 |
| Break Energy (in-lbs) | 49.08 | 46.93 | 27.74 | 43.95 | 31.75 | 42.76 | 36.57 |
| Break Energy (in-lbs/mil) | 47.2 | 40.81 | 23.91 | 37.75 | 28.35 | 36.23 | 30.73 |
| Haze (%) | 5.75 | 8.8 | 8.84 | 12.4 | 17.2 | 10.1 | 14.2 |

TABLE 6-continued

|  | Comp Ex. 1 | Comp Ex. 2 | Comp Ex. 3 | Comp Ex. 4 | Ex. 1 | Ex. 2 | Ex. 3 |
|---|---|---|---|---|---|---|---|
| Clarity (%) | 98.9 | 99.1 | 99.4 | 97.85 | 98.2 | 98.9 | 98.6 |
| Seal Initiation Temp at 1N force (° C.) | 75.2 | 105.1 | 115.4 | 100.8 | 80.7 | 84.3 | 74.5 |
| Seal Temp at 5N force (° C.) | 83.5 | 107.3 | 118.6 | 102.5 | 90.1 | 88.5 | 81.2 |
| Maximum Seal force (N) | 10.2 | 12.9 | 16.6 | 13.3 | 14.1 | 14.2 | 12.9 |
| Peel-break Transition Temp (° C.) | 92.5 | 112.5 | 122.5 | 116.3 | 112.5 | 117.5 | 107.5 |
| Hot Tack Initiation Temp at 1N force (° C.) | 82 | 105 | 115.4 | 103.5 | 86.9 | 90.3 | <80 |
| Hot Tack Temp at 5N force (° C.) | 89.3 | 108.5 | 117.5 | 110.2 | 100.2 | 102 | 82 |
| HotTackWindow@5N (° C.) | 63.3 | 55.6 | 32.2 | 46.6 | 42.1 | 57.5 | 73 |
| Maximum Hot Tack Force (N) | 11.8 | 13.1 | 9.7 | 13.8 | 8.1 | 13.4 | 14.9 |

FIG. 1 depicts a graph illustrating seal temperatures at 5 N of force on the basis of density for the polyolefin compositions relative to different comparative polyethylene compositions. The seal temperature is reversed to show lower temperature on top, reflecting lower is better. Comparative Examples 1-3 forms a reference trend line and Comparative Example 4 is adjacent this line. The inventive Examples 1-3 are significantly above the trend line, indicating they either have lower seal initiation temperature than the Comparative Examples at the same density or have the same or similar seal performance as a Comparative Example at much lower density (0.907 g/cm$^3$).

Figure 2:
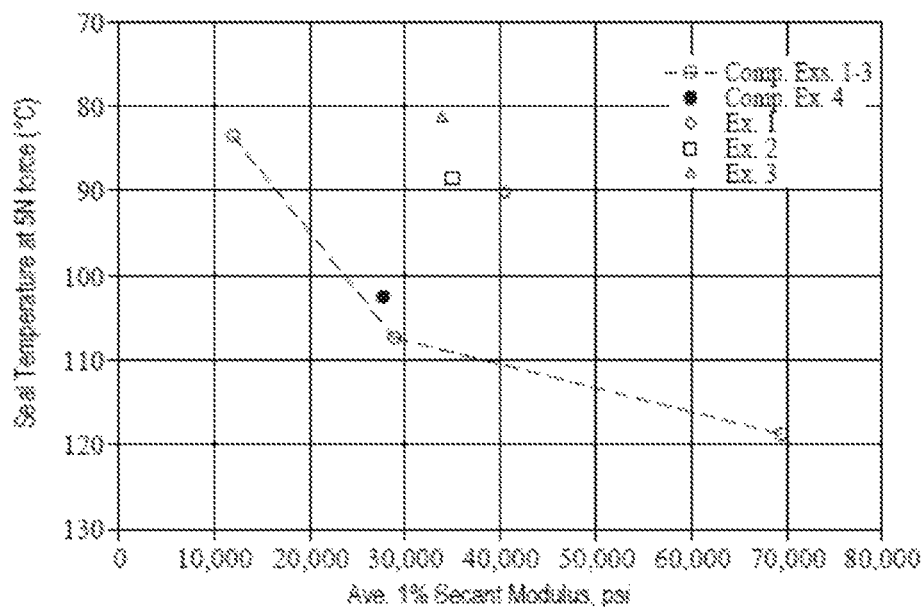
FIG. 2 depicts a graph illustrating seal temperatures at 5 N of force on the basis of film modulus for the polyolefin compositions relative to different comparative polyethylene compositions, according to one or more embodiments.

FIG. 2 depicts a graph illustrating seal temperatures at 5 N of force on the basis of film modulus for the polyolefin compositions relative to different comparative polyethylene compositions. Another way to look at the improved sealing performance is to compare them on stiffness (1% Secant Modulus) basis. Similar to FIG. 1, FIG. 2 shows the inventive Examples 1-3 are significantly greater than the reference line formed between Comparative Examples 1-3, as well as Comparative Example 4, indicating that Examples 1-3 either have better sealing performance at the same stiffness level, or much stiffer than the Comparative Examples with similar sealing performance.

Figure 3:
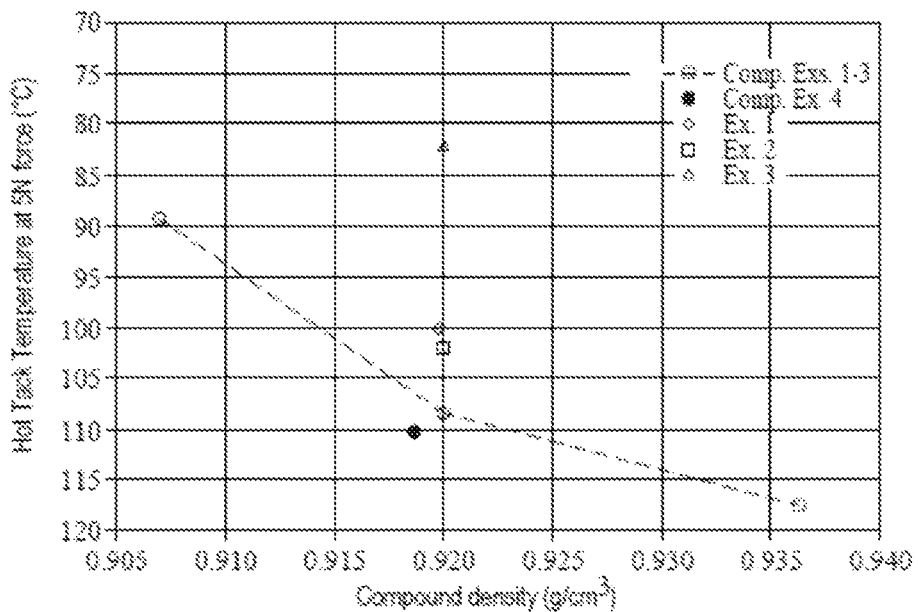
FIG. 3 depicts a graph illustrating hot tack temperatures at 5 N of force on the basis of density for the polyolefin compositions relative to different comparative polyethylene compositions, according to one or more embodiments.
Figure 4:
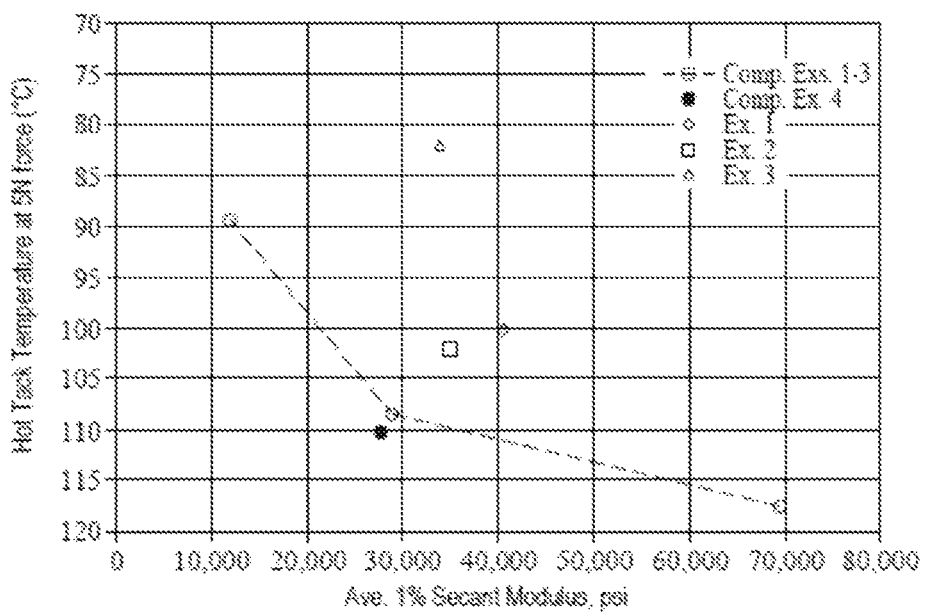
FIG. 4 depicts a graph illustrating hot tack temperatures at 5 N of force on the basis of film modulus for the polyolefin compositions relative to different comparative polyethylene compositions, according to one or more embodiments.

FIG. 3 depicts a graph illustrating hot tack temperatures at 5 N of force on the basis of density for the polyolefin compositions relative to different comparative polyethylene compositions. FIG. 4 depicts a graph illustrating hot tack temperatures at 5 N of force on the basis of film modulus for the polyolefin compositions relative to different comparative polyethylene compositions.

FIG. 3 and FIG. 4 show the inventive Examples 1-3 are significantly greater than the reference line formed between Comparative Examples 1-3, as well as Comparative Example 4, indicating that Examples 1-3 either have better hot tack performance at the same density and stiffness levels, or much better performance than the Comparative Examples.

Figure 5:
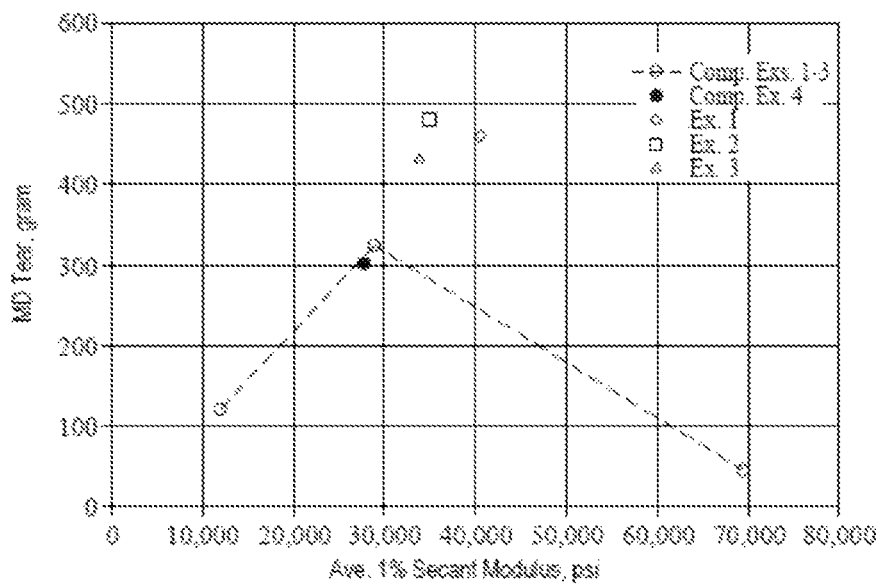
FIG. 5 depicts a graph illustrating Elmendorf Tear values in the machine direction on the basis of film modulus for the polyolefin compositions relative to different comparative polyethylene compositions, according to one or more embodiments.
Figure 6:
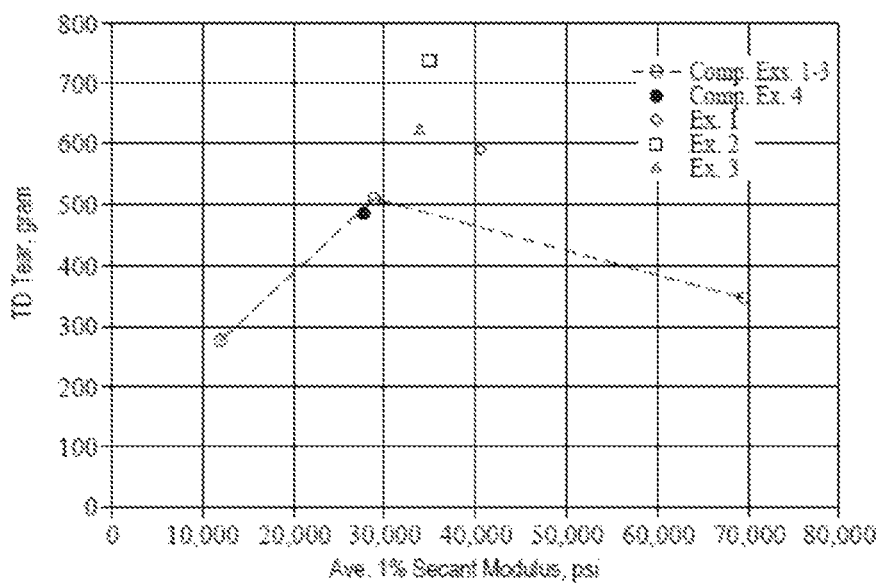
FIG. 6 depicts a graph illustrating Elmendorf Tear values in the transverse direction on the basis of film modulus for the polyolefin compositions relative to different comparative polyethylene compositions, according to one or more embodiments.

FIG. 5 depicts a graph illustrating Elmendorf Tear values in the machine direction on the basis of film modulus for the polyolefin compositions relative to different comparative polyethylene compositions. FIG. 6 depicts a graph illustrating Elmendorf Tear values in the transverse direction on the basis of film modulus for the polyolefin compositions relative to different comparative polyethylene compositions.

Not only do the inventive Examples 1-3 outperform the Comparative Examples 1-4, there is also significant improvement in film toughness (tear performance). FIGS. 5 and 6 compare the MD and TD Tear, respectively, on the basis of stiffness (1% Secant Modulus). Both MD and TD Tear show an intermediate value that is greater than the broad stiffness range for the Comparative Examples 1-4. However, at approximately the same density level, the inventive Examples 1-3 are significantly greater in both stiffness and tear.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below.

The invention claimed is:

1. A polyolefin composition, comprising:
    a) about 40 wt % to about 60 wt %, by weight of the polyolefin composition, of a high-density polyethylene (HDPE) having a density of greater than 0.93 g/cm$^3$ and a melt index of about 0.2 dg/min to about 10 dg/min; and
    b) about 40 wt % to about 60 wt %, by weight of the polyolefin composition, of a linear low-density polyethylene (LLDPE) having a density of less than 0.915 g/cm$^3$ and a melt index of about 0.2 dg/min to about 10 dg/min;
said polyolefin composition having a density of about 0.91 g/cm$^3$ or greater; a melt index of about 0.5 dg/min to about 6 dg/min; and a $T_{w1}-T_{w2}$ value of about −25° C. or less.

2. The polyolefin composition of claim 1, wherein the polyolefin composition has a $T_{w1}-T_{w2}$ value of about −50° C. to about −35° C., and further has either or both of: (i) a $M_{w1}/M_{w2}$ value of about 0.88 to about 1.08; and a density of about 0.915 g/cm$^3$ to about 0.935 g/cm$^3$.

3. The polyolefin composition according to claim 1, wherein the polyolefin composition comprises about 45 wt % to about 55 wt % of the HDPE and about 45 wt % to about 55 wt % of the LLDPE.

4. A film comprising the polyolefin composition according to claim 1.

5. The film of claim 4, wherein the film is a blown film, a cast film, a compression-molded film, a machine-direction oriented film, a biaxial oriented film, or any combination thereof.

6. The film of claim 4, wherein the film comprises an additive at a concentration of about 0.001 wt % to about 2 wt %, based on the weight of the polyolefin composition.

7. The film according to claim 4, wherein the film has one or more of the following properties:
 (a) a 1% Secant average value of about 30,000 psi to about 44,000 psi;
 (b) an Elmendorf Tear value in the machine direction of about 320 g/mil to about 500 g/mil;
 (c) an Elmendorf Tear value in the transverse direction of about 475 g/mil to about 700 g/mil;
 (d) a seal temperature at 5 N of about 80° C. to about 95° C.;
 (e) a peel-break transition temperature of about 100° C. to about 120° C.;
 (f) a hot tack temperature at 1 N of about 70° C. to about 95° C.;
 (g) a hot tack window temperature at 5 N of about 40° C. to about 75° C.; and
 (h) a maximum hot tack force of about 5 N to about 20 N.

8. The film according to claim 7, having all of the properties (a)-(h).

9. The polyolefin composition according to claim 1, wherein the HDPE has an Mw/Mn of about 1 to about 8.

10. The polyolefin composition according to claim 1, wherein the LLDPE has an Mw/Mn of about 1 to about 8.

11. A polyolefin film comprising a polyolefin composition comprising:
 a) about 40 wt % to about 60 wt %, by weight of the polyolefin composition, of a high-density polyethylene (HDPE) comprising a density of greater than 0.93 g/cm$^3$;
 b) about 40 wt % to about 60 wt %, by weight of the polyolefin composition, of a linear low-density polyethylene (LLDPE) comprising a density of less than 0.915 g/cm$^3$;
 c) an additive at a concentration of about 0.001 wt % to about 2 wt %;
wherein the polyolefin composition has a density of about 0.915 g/cm$^3$ to about 0.935 g/cm$^3$;
and a $T_{w1}-T_{w2}$ value of about −60° C. to about −25° C.; and
wherein the film has
 i) an Elmendorf Tear value in the machine direction of about 320 g/mil to about 500 g/mil;
 ii) an Elmendorf Tear value in the transverse direction of about 475 g/mil to about 700 g/mil; and
 iii) a seal temperature at 1 N of about 70° C. to about 85° C. or at 5 N of about 80° C. to about 95° C.

12. A method of forming an article comprising the polyolefin composition of claim 1, comprising:
 extruding or rolling the polyolefin composition to produce a film; and
 cooling the film;
wherein the polyolefin composition comprises:
 a) about 40 wt % to about 60 wt %, by weight of the polyolefin composition, of a high-density polyethylene (HDPE) comprising a density of greater than 0.93 g/cm$^3$;
 b) about 40 wt % to about 60 wt %, by weight of the polyolefin composition, of a linear low-density polyethylene (LLDPE) comprising a density of less than 0.915 g/cm$^3$; and
 c) an additive at a concentration of about 0.001 wt % to about 2 wt %;
wherein the polyolefin composition has a density of about 0.915 g/cm$^3$ to about 0.935 g/cm$^3$;
 and a $T_{w1}-T_{w2}$ value of about −60° C. to about −25° C.; and
wherein the film has
 i) an Elmendorf Tear value in the machine direction of about 320 g/mil to about 500 g/mil;
 ii) an Elmendorf Tear value in the transverse direction of about 475 g/mil to about 700 g/mil; and
 iii) a seal temperature at 1 N of about 70° C. to about 85° C. or at 5 N of about 80° C. to about 95° C.

13. The method of claim 12, wherein cooling the film comprises blowing air on at least a portion of the film.

* * * * *